United States Patent
Park et al.

(10) Patent No.: US 10,177,372 B2
(45) Date of Patent: Jan. 8, 2019

(54) METAL OXIDE COMPOSITE AND METHOD OF PREPARING THE SAME

(71) Applicant: Samsung Electronics Co., Ltd., Suwon-si, Gyeonggi-do (KR)

(72) Inventors: Hwiyeol Park, Ansan-si (KR); Hojung Yang, Suwon-si (KR); Kyunghoon Cho, Suwon-si (KR); Jin S. Heo, Suwon-si (KR); Seunghoon Nam, Seoul (KR); Huisu Jeong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 69 days.

(21) Appl. No.: 15/063,711

(22) Filed: Mar. 8, 2016

(65) Prior Publication Data

US 2017/0047582 A1    Feb. 16, 2017

(30) Foreign Application Priority Data

Aug. 13, 2015   (KR) .................. 10-2015-0114550

(51) Int. Cl.

| | |
|---|---|
| *H01M 4/36* | (2006.01) |
| *H01M 4/131* | (2010.01) |
| *H01M 4/485* | (2010.01) |
| *H01M 4/525* | (2010.01) |
| *H01M 4/1391* | (2010.01) |
| *H01M 4/66* | (2006.01) |
| *H01M 4/58* | (2010.01) |
| *H01M 4/04* | (2006.01) |

(52) U.S. Cl.
CPC ......... *H01M 4/366* (2013.01); *H01M 4/0414* (2013.01); *H01M 4/0471* (2013.01); *H01M 4/131* (2013.01); *H01M 4/1391* (2013.01); *H01M 4/485* (2013.01); *H01M 4/525* (2013.01); *H01M 4/5825* (2013.01); *H01M 4/661* (2013.01); *H01M 4/662* (2013.01)

(58) Field of Classification Search
None
See application file for complete search history.

(56) References Cited

U.S. PATENT DOCUMENTS

| | | | | |
|---|---|---|---|---|
| 2010/0119886 A1* | 5/2010 | Nielsen | ............... | H01M 8/0217 429/465 |
| 2013/0009209 A1* | 1/2013 | Yamazaki | ........... | H01L 27/1225 257/192 |
| 2014/0042438 A1* | 2/2014 | Yamazaki | ......... | H01L 29/78693 257/43 |

FOREIGN PATENT DOCUMENTS

| | | |
|---|---|---|
| JP | 1999-286704 A | 10/1999 |
| JP | 2011-106023 A | 6/2011 |
| KR | 1020040025177 A | 3/2004 |
| KR | 10-0710459 B1 | 4/2007 |
| KR | 10-0888770 B1 | 3/2009 |

* cited by examiner

*Primary Examiner* — Sin J Lee
(74) *Attorney, Agent, or Firm* — Cantor Colburn LLP

(57) ABSTRACT

A metal oxide composite including a first metal oxide composite layer, and a second metal oxide layer, wherein the first metal oxide composite layer and the second metal oxide layer are alternately stacked in a thickness direction; and a third metal oxide layer that is disposed on a side surface of the stacked structure, wherein the third metal oxide layer includes a metal oxide that is a same metal oxide as a metal oxide included in the stacked structure.

18 Claims, 26 Drawing Sheets

METAL OXIDE COMPOSITE AND METHOD OF PREPARING THE SAME

CROSS-REFERENCE TO RELATED APPLICATION

This application claims priority to and the benefit of Korean Patent Application No. 10-2015-0114550, filed on Aug. 13, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a metal oxide composite and a method of preparing the metal oxide composite.

2. Description of the Related Art

As technology in the electronics field develops, markets for various portable electronic devices, such as cellular phones, game devices, portable multimedia players (PMP), MPEG audio layer-3 (MP3) players, smartphones, smart pads, electronic-book terminals, tablet computers, and mobile medical devices worn on a human body have grown. Accordingly, with an increase in the portable electronic device market, demand for batteries appropriate for driving portable electronic devices has increased.

Secondary batteries refer to batteries capable of charging and discharging, whereas primary batteries are not rechargeable. In particular, a lithium battery has a higher voltage and a higher energy density per unit weight than a nickel-cadmium battery or a nickel-hydrogen battery. There remains a need for improved electrodes for batteries.

SUMMARY

Provided is a metal oxide composite in which occurrence of cracking and peeling are suppressed.

Provided is a method of preparing the metal oxide composite.

Additional aspects will be set forth in part in the description which follows and, in part, will be apparent from the description, or may be learned by practice of the presented exemplary embodiments.

According to an aspect of an exemplary embodiment, a metal oxide composite includes a stacked structure that includes a first metal oxide composite layer, and a second metal oxide layer, wherein the first metal oxide composite layer and the second metal oxide layer are alternately stacked in a thickness direction; and a third metal oxide layer that is disposed on the stacked structure, wherein the third metal oxide layer includes a metal oxide that is a same metal oxide as a metal oxide included in the stacked structure.

Also disclosed is a battery including the metal oxide composite of claim 1.

According to an aspect of another exemplary embodiment, a method of preparing a metal oxide composite includes: alternately stacking a first metal oxide composite sheet and a second metal oxide sheet to prepare a stacked structure; disposing a composition that includes a third metal oxide on a side surface of the stacked structure; and then sintering the stacked structure to prepare the metal oxide composite, wherein the composition including the third metal oxide includes a metal oxide that is a same metal oxide as a metal oxide included in the stacked structure.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
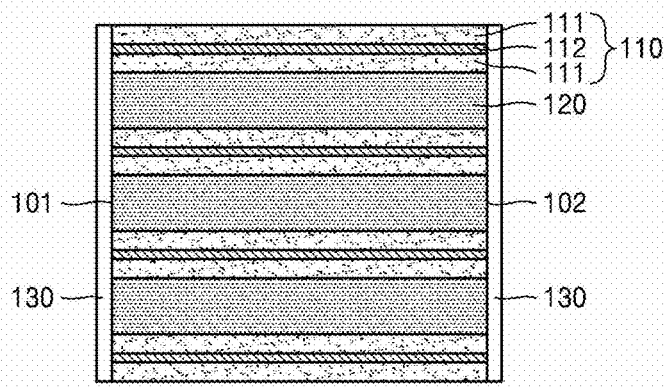
FIG. 1 is a schematic view illustrating a structure of a metal oxide composite according to an exemplary embodiment.

Reference will now be made in detail to a metal oxide composite and a method of preparing the metal oxide composite, examples of which are illustrated in the accompanying drawings, wherein like reference numerals refer to like elements throughout. Also, the size of each layer illustrated in the drawings may be exaggerated for convenience of explanation and clarity. Also, when a material layer is described as existing on a substrate or another layer, the material layer may be directly on a substrate or another layer or may have a third layer therebetween. Also, materials forming layers in embodiments are exemplary and thus should not be construed as being limited to the descriptions set forth herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In recent years, a secondary battery having a high capacity and including an electrode having a 3-dimentional structure have been studied. In order to prepare an electrode of a 3-dimentional structure, a stacked structure of sintered metal oxide is needed. The stacked structure of sintered metal oxide is manufactured by preparing a stacked structure of metal oxide by stacking a plurality of different metal oxide layers and sintering the stacked metal oxide layers. However, during or after a sintering process, cracking and peeling may occur due to difference of sintering behavior of the metal oxide layers having different compositions. Thus, a method of preparing the sintered metal oxide stacked structure without cracking and peeling in the metal oxide layer is needed.

According to an exemplary embodiment, a metal oxide composite includes a stacked structure including a first metal oxide composite layer and a second metal oxide layer that are alternately stacked in a thickness direction; and a third metal oxide layer that is disposed on a side surface of the stacked structure, wherein the third metal oxide layer includes a metal oxide that is a same metal oxide as a metal oxide included in the stacked structure.

The side surface may intersect the first metal oxide composite layer, the second metal oxide layer, or the first metal oxide composite layer and the second metal oxide layer.

The side surface of the stack structure may comprise a first side surface and an opposite second side surface, and the third metal oxide layer may be disposed on the first side surface, the second side surface, or both the first side surface and the second side surface.

In an embodiment, the surface of the stack structure comprises an end surface, which extends along and is spaced apart from the first metal oxide composite layer or the second metal oxide layer, and the third metal oxide layer may be disposed on the end surface.

The end surface of the stack structure may comprise a first end surface and an opposite second end surface, and the third metal oxide layer may be disposed on the first end surface, the second end surface, or both the first end surface and the second end surface.

In the metal oxide composite, the third metal oxide layer may be disposed on the first side surface and the second side surface, which may be opposite the first side surface of the stacked structure and thus may cover a plurality of the metal oxide layers, which otherwise would be exposed on the side surfaces of the stacked structure. Since the third metal oxide layer suppresses a difference between sintering behaviors of the metal oxide layers, which have different compositions in the stacked structure, cracking and peeling of the metal oxide composite during or after a sintering process may be suppressed, and the metal oxide composite may have a more compact structure. Further, since the third metal oxide layer includes a metal oxide that is the same as a metal oxide included in the stacked structure, the metal oxide composite may have improved purity. Further, if desired an additive, such as an additive for suppressing a difference between sintering behaviors of the different metal oxide layers in the stacked structure, may be omitted from the metal oxide composite. D f. Therefore, deterioration of physical properties, such as an increase in a resistance of the metal oxide composite due to impurities derived from the additive, may be prevented. Further, a manufacturing process thereof may be simplified.

FIG. 1 is a schematic view of a metal oxide composite 200 according to an exemplary embodiment.

Referring to FIG. 1, the metal oxide composite 200 includes a stacked structure 100 including a first metal oxide composite layer 110 and a second metal oxide layer 120, that are alternately stacked in a thickness direction; and a third metal oxide layer 130 that is disposed on a side, e.g., a first side surface 101 and an opposite second side surface 102 of the stacked structure 100 in a thickness direction of the stacked structure 100, wherein the third metal oxide layer 130 includes a metal oxide that is the same as a metal oxide included in the stacked structure 100.

Figure 2:
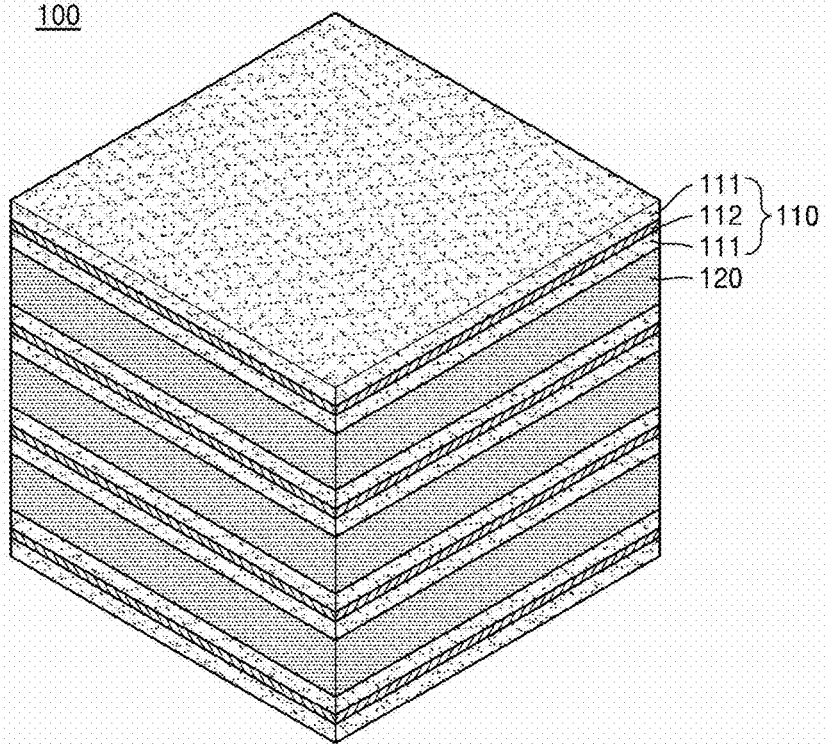
FIG. 2 is a schematic view illustrating a structure of a stacked structure according to an exemplary embodiment.

Referring to FIG. 2, the stacked structure 100 is a 3-dimentional structure that includes a first metal oxide composite layer 110 and a second metal oxide layer 120 that are alternately stacked in a thickness direction. The number of the first metal oxide composite layer 110 and the second metal oxide layer 120 in the stacked structure 100 may each be 1 to about 2000, about 2 to about 1000, or about 4 to about 500, respectively, but embodiments are not limited thereto, and the number of the first metal oxide composite layer 110 and the second metal oxide layer 120 may appropriately selected, e.g., depending on a desired thickness of the stacked structure 100.

Figure 3:
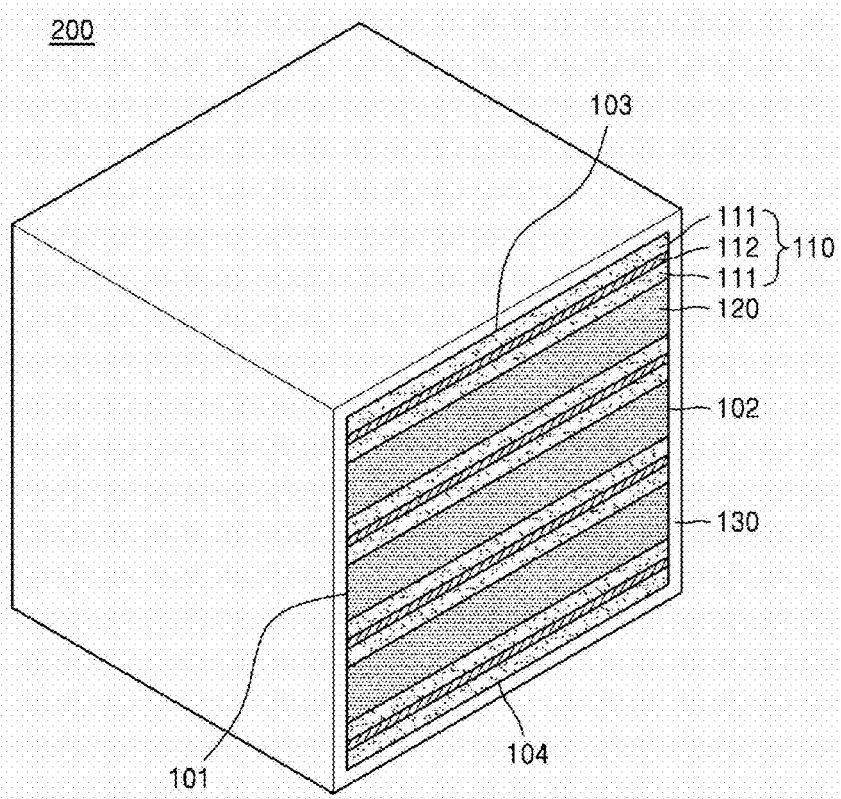
FIG. 3 is a schematic view illustrating a structure of a metal oxide composite according to another exemplary embodiment.

Referring to FIG. 3, in the metal oxide composite 200, the third metal oxide layer 130 may be disposed on a first surface 103 and an opposite second surface 104 and on a first side surface 101 and an opposite second surface 102 of the stacked structure 100. That is, the third metal oxide layer 130 may sequentially surround the stacked structure 100 in the order of covering the first side surface 101, the first surface 103 adjacent to the first side surface 101, the second side surface 102 adjacent to the first surface 103, and the second surface 104, which may be adjacent to the second side surface. When the third metal oxide layer 130 surrounds both the side surfaces of the stacked structure 100, peeling and cracking that may occur in the metal oxide layers during a sintering process in the manufacture of the metal oxide composite 200 may be prevented.

Figure 4:
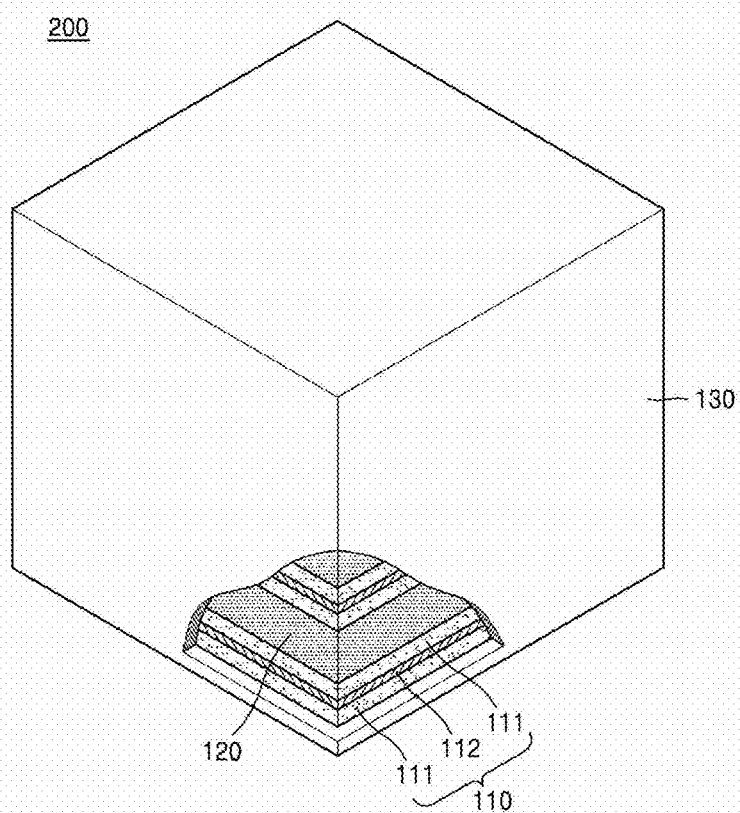
FIG. 4 is a schematic view illustrating a structure of a metal oxide composite according to another exemplary embodiment.

Referring to FIG. 4, the third metal oxide layer 130 may completely surround all surfaces and sides of the stacked structure 100. That is, the third metal oxide layer 130 may completely cover the stacked structure 100. When the third metal oxide layer 130 completely covers all surfaces of the stacked structure 100, the metal oxide layers included in the stacked structure 100 may be completely blocked from the outside, and thus, peeling and cracking that may occur in the metal oxide layers during a sintering process may be effectively prevented.

Referring to FIGS. 1, 3, and 4, in the metal oxide composite 200, the third metal oxide layer 130 may include a first metal oxide or a second metal oxide. Thus, the third metal oxide layer 130 may have the same composition as the metal oxide included in the first metal oxide composite layer 110 or the second metal oxide layer 120.

For example, referring to FIGS. 1, 3, and 4, in the metal oxide composite 200, the first side surface 101 and the opposite second side surface 102 of the stacked structure 100 may be substantially or entirely covered with the first metal oxide included in the first metal oxide composite layer 110. Thus, two end surfaces and two side surfaces of the second metal oxide layer 120 may be covered or all surfaces and sides of the second metal oxide layer 120 may be completed covered by a matrix formed of the first metal oxide. Therefore, peeling and cracking that may occur in the first metal oxide composite layer 110 and the second metal oxide layer 120 during a sintering process may be effectively prevented.

Alternatively, referring to FIGS. 1, 3, and 4, in the metal oxide composite 200, the first side surface 101 and the opposite second side surface 102 of the stacked structure 100 may be substantially or entirely covered with the second metal oxide layer 120. Thus, two end surfaces and two side surfaces of the first metal layer 110 may be covered or all surfaces and sides of the first metal layer 110 may be completed covered by a matrix formed of the second metal oxide. Therefore, peeling and cracking that may occur in the first metal oxide composite layer 110 and the second metal oxide layer 120 during a sintering process may be effectively prevented.

Referring to FIGS. 1, 3, and 4, in the metal oxide composite 200, a thickness of the third metal oxide layer 130 may be about 50 micrometers (μm) or less, but embodiments are not limited thereto, and the thickness of the third metal oxide layer 130 may be appropriately selected to suppress peeling and cracking that may occur in the metal oxide composite 200. For example, a thickness of the third metal oxide layer 130 may be in a range of about 1 μm to about 50 μm. For example, a thickness of the third metal oxide layer 130 may be in a range of about 1 μm to about 40 μm. For example, a thickness of the third metal oxide layer 130 may be in a range of about 1 μm to about 30 μm. For example, a thickness of the third metal oxide layer 130 may be in a range of about 1 μm to about 25 μm. For example, a thickness of the third metal oxide layer 130 may be in a range of about 2 μm to about 25 μm.

Referring to FIGS. 1 to 4, in the stacked structure 100 and the metal oxide composite 200, the first metal oxide composite layer 110 may include a current collector layer 112 and an electrode layer 111 that is disposed on a surface of the current collector layer 112. The current collector layer 112 is disposed on a surface of the electrode layer 111 and thus electrically connected to the electrode layer 111. For example, in the metal oxide composite 200, the current collector layer 112 may be disposed between two electrode layers 111 that are adjacent to each other. When the current collector layer 112 is disposed between the electrode layers 111 that are adjacent to each other, the current collector layer 112 is embedded in the first metal oxide composite layer 110 and thus may form an internal current collector layer.

Referring to FIGS. 1 to 4, in the metal oxide composite 200, the electrode layer 111 may include a first metal oxide that is selected from a lithium transition metal oxide, a lithium transition metal phosphate, a transition metal oxide, and a transition metal sulfide. Therefore, the first metal oxide composite layer 110 includes the first metal oxide. The first metal oxide may be a cathode active material of a lithium battery.

The electrode layer 111 may include a lithium cobalt oxide, a lithium nickel cobalt manganese oxide, a lithium nickel cobalt aluminum oxide, a lithium iron phosphate, or a lithium manganese oxide, as the first metal oxide, but embodiments are not limited thereto, and any suitable cathode active material available in the art may be used.

For example, the electrode layer 111 may include a cathode active material that is represented by one of $Li_aA_{1-b}B'_bD_2$ (where, $0.90 \leq a \leq 1.8$ and $0 \leq b \leq 0.5$); $Li_aE_{1-b}B'_bO_{2-c}D_c$ (where, $0.90 \leq a \leq 1.8$, $0 \leq b \leq 0.5$, and $0 \leq c \leq 0.05$); $LiE_{2-b}B'_bO_{4-c}D_c$ (where, $0 \leq b \leq 0.5$ and $0 \leq c \leq 0.05$); $Li_aNi_{1-b-c}Co_bB'_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where, $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where, $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where, $0.90 \leq a \leq 1.8$, $0 \leq 0.5$, $0 \leq 0.05$, and $0 < \alpha < 2$); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1.8$ and $0.001 \leq b \leq 0.1$); $Li_aCoG_bO_2$ (where, $0.90 \leq a \leq 1.8$ and $0.001 \leq b \leq 0.1$); $Li_aMnG_bO_2$ (where, $0.90 \leq a \leq 1.8$ and $0.001 \leq b \leq 0.1$); $Li_aMn_2G_bO_4$ (where, $0.90 \leq a \leq 1.8$ and $0.001 \leq b \leq 0.1$); $QO_2$; $V_2O_5$; $LiV_2O_5$; $LiI'O_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A is Ni, Co, Mn, or a combination thereof; B' is Al, Ni, Co, Mn, Cr, Fe, Mg, Sr, V, a rare-earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

The cathode active material represented by the formulae above may further have a coating layer on a surface thereof. The coating layer may include an oxide of a coating element, a hydroxide of a coating element, an oxyhydroxide of a coating element, an oxycarbonate of a coating element, or a hydroxycarbonate of a coating element. The compound that forms the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The electrode layer 111 includes a cathode active material that is represented by the formulae above and has no coating layer and a mixture of a cathode active material that is represented by one of the formulae above and further has a coating layer.

For example, the electrode layer 111 may include a cathode active material selected from $LiNiO_2$, $LiCoO_2$, $LiMn_xO_{2x}$ (where, x is 1 or 2), $LiNi_{1-x}Mn_xO_2$ (where, $0<x<1$), $LiNi_{1-x-y}Co_xMn_yO_2$ (where, $0 \leq x \leq 0.5$ and $0 \leq y \leq 0.5$), $LiFePO_4$, $LiFeO_2$, $V_2O_5$, TiS, and MoS.

Referring to FIGS. 1 to 4, in the metal oxide composite 200, the current collector layer 112 may include at least one selected from Al, Ag, Cu, Ni, Co, Cr, W, Mo, Pd, Pt, an Ag—Pd alloy, an Ag—Pt alloy, an Ag—Pd—Pt alloy, and a Pd—Pt alloy, but embodiments are not limited thereto, and any suitable metal or alloy available as a current collector in the art may be used. The metal or alloy needs to be volatile or that does not generate side reactions at a sintering temperature of about 800° C. or higher.

Referring to FIGS. 1 to 4, in the metal oxide composite 200, a thickness of the current collector layer 112 may be about 10 μm or less, but embodiments are not limited thereto, and the thickness of the current collector layer 112 may be appropriately changed to suppress cracking and peeling that may occur in the metal oxide composite 200. For example, a thickness of the current collector layer 112 may be in a range of about 0.1 μm to about 10 μm. For example, a thickness of the current collector layer 112 may be in a range of about 0.1 μm to about 9 μm. For example, a thickness of the current collector layer 112 may be in a range of about 0.1 μm to about 8 μm. For example, a thickness of the current collector layer 112 may be in a range of about 0.1 μm to about 7 μm. For example, a thickness of the current collector layer 112 may be in a range of about 0.1 μm to about 6 μm. For example, a thickness of the current collector layer 112 may be in a range of about 0.1 μm to about 5 μm.

Referring to FIGS. 1 to 4, in the metal oxide composite 200, a thickness of the first metal oxide composite layer 110 may be about 100 μm or less, but embodiments are not limited thereto, and the thickness of the first metal oxide composite layer 110 may be appropriately selected to suppress cracking and peeling that may occur in the metal oxide composite 200. For example, a thickness of the first metal oxide composite layer 110 may be in a range of about 1 μm to about 100 μm. For example, a thickness of the first metal oxide composite layer 110 may be in a range of about 1 μm to about 50 μm. For example, a thickness of the first metal oxide composite layer 110 may be in a range of about 1 μm to about 40 μm. For example, a thickness of the first metal oxide composite layer 110 may be in a range of about 2 μm to about 30 μm. For example, a thickness of the first metal oxide composite layer 110 may be in a range of about 2 μm to about 25 μm. For example, a thickness of the first metal oxide composite layer 110 may be in a range of about 2 μm to about 20 μm.

Referring to FIGS. 1 to 4, in the metal oxide composite 200, the second metal oxide layer 120 may be a sacrificial layer. The second metal oxide layer 120 includes the second metal oxide that may be removed by etching. The second metal oxide may be, for example, $Li_2CoSiO_4$, but embodiments are not limited thereto, and any material available as a sacrificial layer in the art may be used.

Referring to FIGS. 1 to 4, in the metal oxide composite 200, a thickness of the second metal oxide layer 120 may be about 200 μm or less, but embodiments are not limited thereto, and the thickness of the second metal oxide layer 120 may be appropriately changed to suppress cracking and peeling that may occur in the metal oxide composite 200. For example, a thickness of the second metal oxide layer 120 may be in a range of about 2 μm to about 200 μm. For example, a thickness of the second metal oxide layer 120 may be in a range of about 3 μm to about 200 μm. For example, a thickness of the second metal oxide layer 120 may be in a range of about 3 μm to about 150 μm. For example, a thickness of the second metal oxide layer 120 may be in a range of about 3 μm to about 100 μm. For example, a thickness of the second metal oxide layer 120 may be in a range of about 5 μm to about 50 μm. For example, a thickness of the second metal oxide layer 120 may be in a range of about 20 μm to about 45 μm.

Referring to FIGS. 1 to 4, in the metal oxide composite 200, a thickness ratio of the first metal oxide composite layer 111 and the second metal oxide layer 120 may be in a range of about 1:08 to about 1:1.5. That is, a thickness of the second metal oxide layer 120 may be thicker than that of the first metal oxide composite layer 110. Since the second metal oxide layer 120 is a sacrificial layer, thus other layers may be inserted after removing the second metal oxide layer 120 by performing etching, and thus a thickness of the second metal oxide layer 120 may be thicker than that of the first metal oxide composite layer 110.

Referring to FIGS. 1 to 4, a size of the metal oxide composite 200 may be about 1 millimeter (mm) to 50 cm×about 1 mm to 50 cm×about 1 mm to 30 cm, but embodiments are not limited thereto, and the size of the metal oxide composite 200 may be selected depending on the desired size of the battery. For example, a size of the metal oxide composite 200 may be about 1 mm to 20 cm×about 1 mm to 20 cm×about 1 mm to 10 cm. For example, a size of the metal oxide composite 200 may be about 1 mm to 10 cm×about 1 mm to 10 cm×about 1 mm to 5 cm. For example, a size of the metal oxide composite 200 may be about 1 mm to 2 cm×about 1 mm to 2 cm×about 1 mm to 1 cm.

According to another exemplary embodiment, a method of preparing the metal oxide composite includes alternately stacking a first metal oxide composite sheet and a second metal oxide sheet to prepare a stacked structure; providing a composition that includes a third metal oxide on a side surface of the stacked structure; and sintering the stacked structure provided with the composition to obtain a metal oxide composite, wherein the composition including the third metal oxide includes a metal oxide that is the same as a metal oxide comprised in the stacked structure.

The method may provide a metal oxide composite that prevents cracking and peeling of the first metal oxide composite sheet and the second metal oxide sheets of the stacked structure during a sintering process and has a homogenous and compact structure by providing the composition including the third metal oxide on a side surface of the stacked structure. Further, if desired use a separate additive to prevent a difference between sintering behaviors of the first metal oxide composite sheet and the second metal oxide sheet may be omitted. Omitting the additive can avoid an additional treatment process, and thus may provide a metal oxide composite of improved purity through a simplified process.

Referring to FIGS. 5A to 5E, a method of preparing a metal oxide composite 200 includes alternately stacking a first metal oxide composite sheet 110 and a second metal oxide sheet 120 to prepare a stacked structure 100 (FIG. 5A); providing a composition 130 that includes a third metal oxide on a side surface, e.g., a first side surface 101 and an opposite second side surface 102 of the stacked structure 100 (FIG. 5B); and sintering the stacked structure 100 provided with the composition 130 to obtain a metal oxide composite 200 (FIG. 5E), wherein the composition 130 including the third metal oxide includes a metal oxide that is the same as a metal oxide comprised in the stacked structure 100.

Figure 5A:
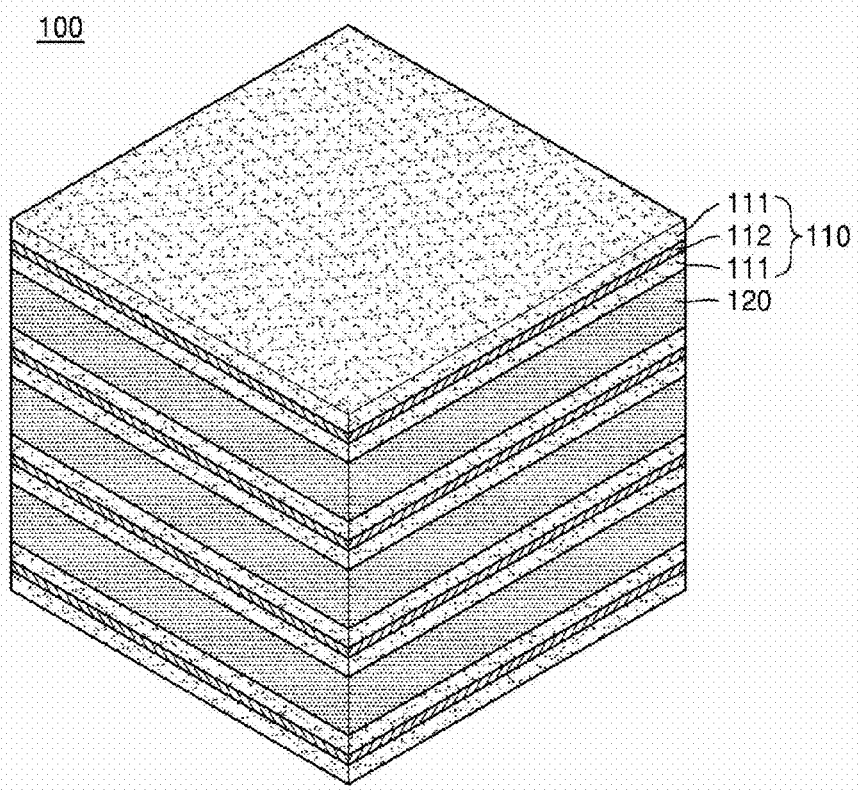
FIGS. 5A to 5E are schematic views illustrating a method of preparing a metal oxide composite prepared in Example 1.

Referring to FIG. 5A, in the method of preparing the metal oxide composite 200, the first metal oxide composite sheet 110 may be prepared by sequentially stacking an electrode sheet 111, a current collector layer 112, and an electrode sheet 111.

The electrode sheet 111 may include a first metal oxide such as a lithium cobalt oxide, a lithium nickel cobalt manganese oxide, a lithium nickel cobalt aluminum oxide, a lithium iron phosphate, or a lithium manganese oxide, but embodiments are not limited thereto, and any suitable metal oxide available as a cathode active material in the art may be used.

The current collector layer 112 may be prepared by coating a slurry including a conducting material on the electrode sheet 111. The conducting material may be at least one selected from Ni, Co, Cr, W, Pd, Pt, Mo, an Ag—Pd alloy, an Ag—Pt alloy, an Ag—Pd—Pt alloy, and a Pd—Pt alloy, but embodiments are not limited thereto.

The electrode sheet 111 may include the first metal oxide, a dispersing agent, a binder, a plasticizing agent, and a sintering aid, and an amount of the first metal oxide in the powder form may be about 80 wt % or greater, based on the total weight of the electrode sheet 111. The dispersing agent, binder, plasticizing agent, and sintering aid in the electrode sheet 111 may be decomposed and thus removed during a sintering process. A particle diameter (D50) of the first metal oxide powder may be in a range of about 0.01 µm to about 5 µm. For example, a particle diameter (D50) of the first metal oxide powder may be in a range of about 0.1 µm to about 2 µm. For example, a particle diameter (D50) of the first metal oxide powder may be in a range of about 0.1 µm to about 1 µm.

Referring to FIG. 5A, in the method of preparing the metal oxide composite 200, the stacked structure 100 may be prepared by sequentially and alternately stacking the first metal oxide composite sheet 110 and the second metal oxide sheet 120.

The second metal oxide sheet 120 may include a sacrificial layer material, such as $Li_2CoSiO_4$, as a second metal oxide, but embodiments are not limited thereto.

The second metal oxide sheet 120 includes the second metal oxide, a dispersing agent, a binder, a plasticizing agent, and a sintering aid, and an amount of the second metal oxide in the powder form may be about 80 wt % or greater, based on the total weight of the second metal oxide sheet 120. The dispersing agent, the binder, the plasticizing agent, and the sintering aid in the metal oxide sheet 120 may be decomposed and thus removed during a sintering process. A particle diameter (D50) of the second metal oxide powder may be in a range of about 0.1 µm to about 5 µm. For example, a particle diameter (D50) of the second metal oxide powder may be in a range of about 0.1 µm to about 2 µm. For example, a particle diameter (D50) of the second metal oxide powder may be in a range of about 0.1 µm to about 1 µm.

Figure 5B:
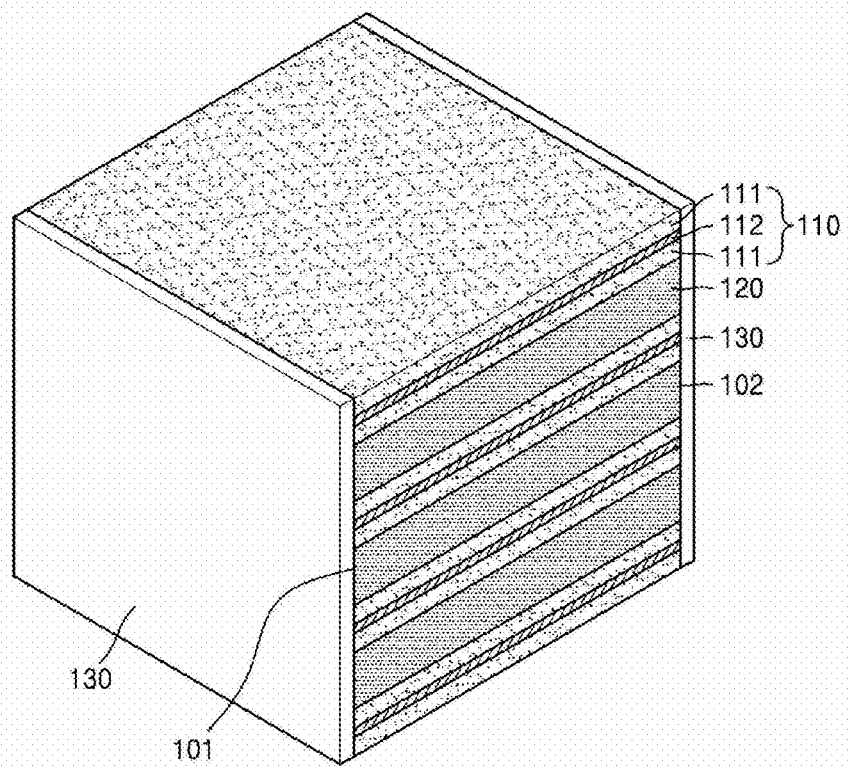

Referring to FIG. 5B, in the method of preparing the metal oxide composite 200, the composition 130 including the third metal oxide may be provided in the state of a slurry, a sheet, or a powder, but embodiments are not limited thereto, and the composition 130 may be in any suitable state that may be used in the art.

Referring to FIG. 5B, in the method of preparing the metal oxide composite 200, the composition 130 including the third metal oxide may be provided on a side surface, e.g., a first side surface 101 and a second side surface 102 by using a method such as screen printing of the composition 130 in the slurry form, spin coating of the composition 130 in the slurry form, brushing of the composition 130 in the slurry form, disposing the composition sheet 130 or a warm isostatic press (WIP) of the composition sheet 130. When the composition sheet 130 is disposed, a thickness of the third metal oxide layer 130 that is obtained after sintering may be easily controlled according to a thickness of the provided composition sheet 130.

Figure 6A:
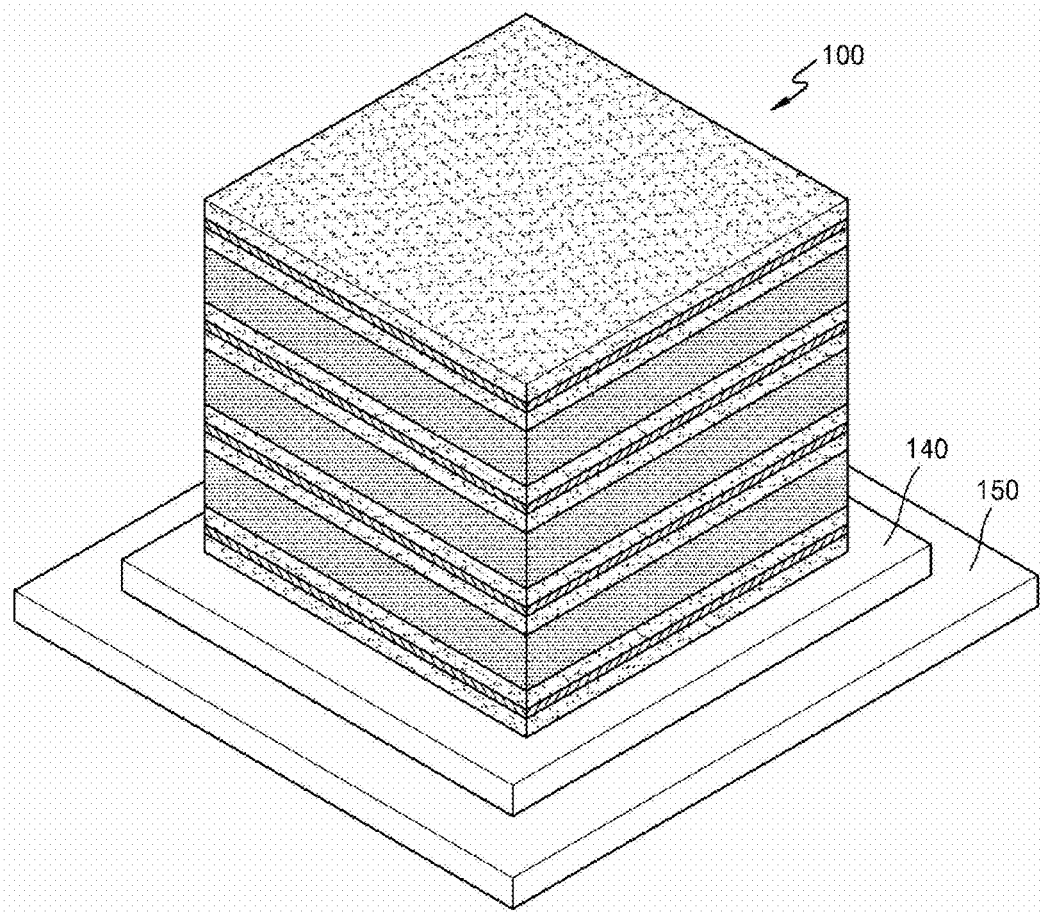
FIGS. 6A to 6C are schematic views illustrating a method of preparing metal oxide composites prepared in Examples 2 to 4.
Figure 6B:
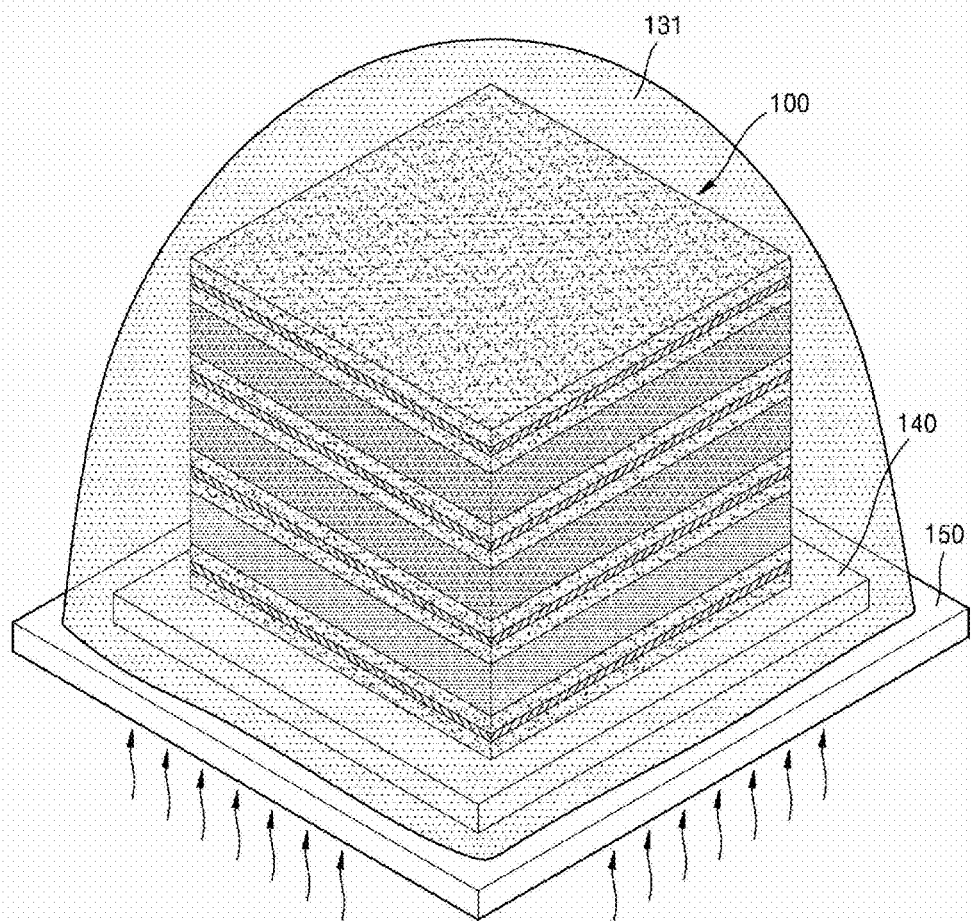

Alternatively, referring to FIG. 6B, in the method of preparing the metal oxide composite 200, the providing of the composition 130 including the third metal oxide may be performed by embedding the stacked structure 100 in a composition of dry powder 131. That is, the stacked structure 100 may be completely covered with the powder 131 including the third metal oxide.

Figure 5C:
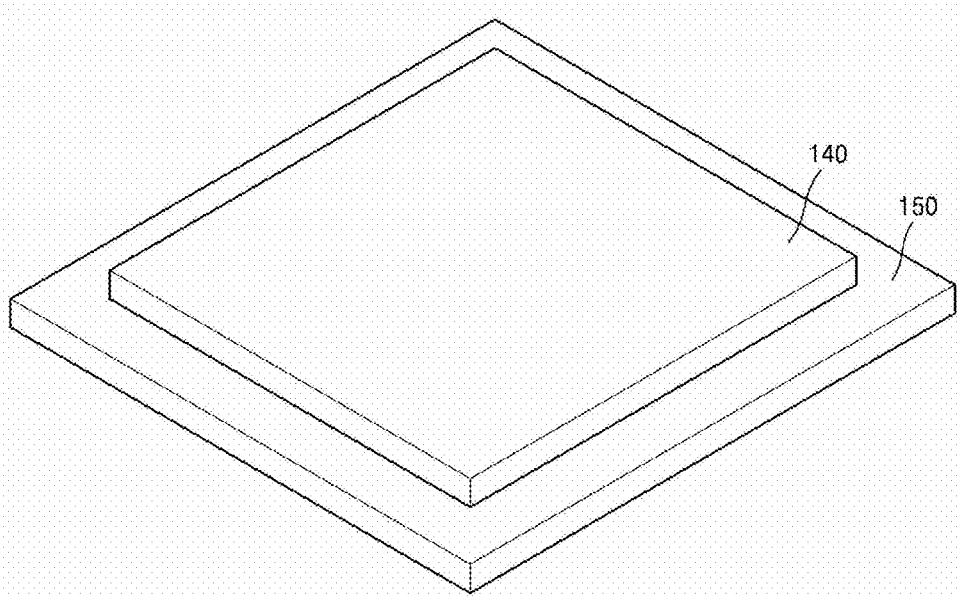
Figure 5D:
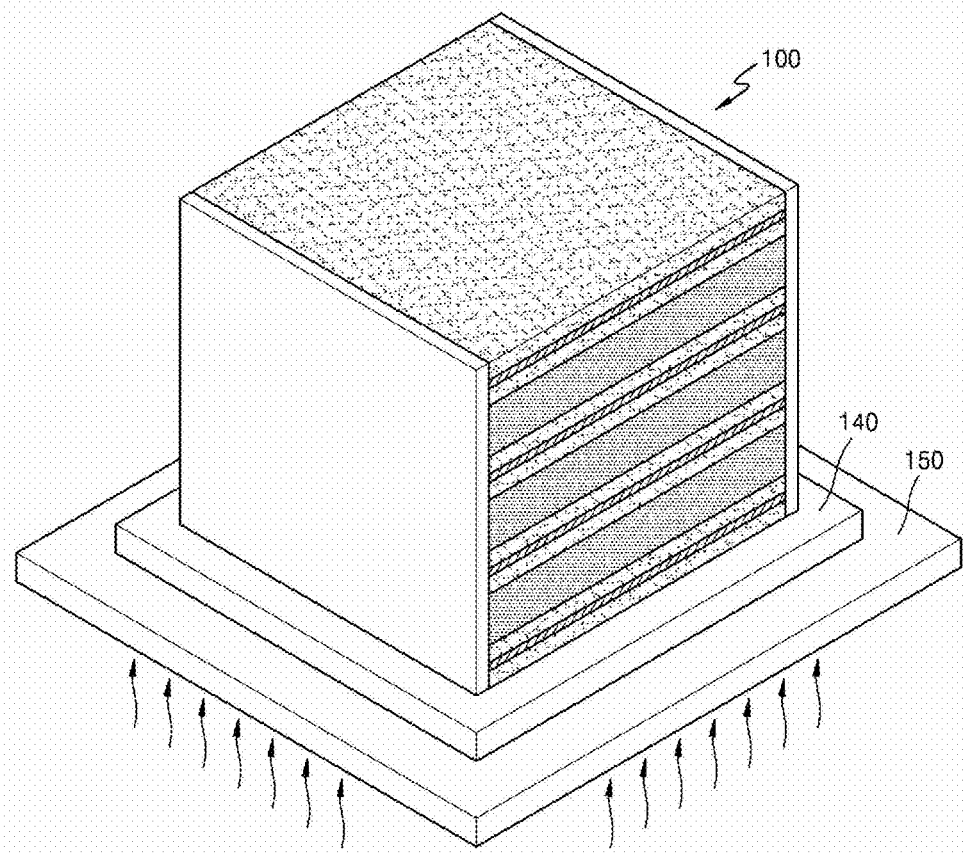

Referring to FIGS. 5C to 5D, in the method of preparing the metal oxide composite 200, the sintering may be performed after disposing a third metal oxide powder layer 140 on a substrate 150 and disposing the stacked structure 100 provided with the composition 130 including the third metal oxide on the third metal oxide powder layer 140. The third metal oxide powder layer 140 may prevent impurities generated by a reaction between the substrate 150 and the stacked structure 100 during the sintering process. The substrate 150 may be, for example, an alumina ($Al_2O_3$) substrate. The third metal oxide powder layer 140 may be a metal oxide that is the same with a metal oxide included in the composition 130 including the third metal oxide. For example, the third metal oxide powder layer 140 may be a first metal oxide powder or a second metal oxide powder. For example, the third metal oxide powder layer 140 may include a LiCoO$_2$ powder or a Li$_2$CoSiO$_4$ powder.

Referring to FIG. 5D, in the method of preparing the metal oxide composite 200, the sintering may be performed at a temperature in a range of about 800° C. to about 1100° C. for 1 minute to about 20 hours, but embodiments are limited thereto, and the conditions of the sintering may be appropriately selected according to conditions for the desired metal oxide composite 200. For example, the sintering may be performed at a temperature in a range of about 1000° C. to about 1100° C. for 1 minute to about 10 hours. For example, the sintering may be performed at a temperature in a range of about 1000° C. to about 1100° C. for 1 minute to about 8 hours. For example, the sintering may be performed at a temperature in a range of about 1000° C. to about 1100° C. for 1 minute to about 6 hours. For example, the sintering may be performed at a temperature in a range of about 1000° C. to about 1100° C. for 1 minute to about 4 hours. For example, the sintering may be performed at a temperature in a range of about 1000° C. to about 1100° C. for 1 minute to about 2 hours. For example, the sintering may be performed at a temperature in a range of about 1000° C. to about 1100° C. for 1 minute to about 1 hour. For example, the sintering may be performed at a temperature in a range of about 1000° C. to about 1100° C. for 1 minute to about 30 minutes. For example, the sintering may be performed at a temperature in a range of about 1000° C. to about 1100° C. for 1 minute to about 15 minutes. When a period of time for the sintering reduces, a productivity for a preparation of the metal oxide composite 200 thus prepared my increase. A sintering atmosphere is not particularly limited, and the sintering may be performed in an air atmosphere, an oxygen atmosphere, or an inter atmosphere of nitrogen or argon.

In some embodiments, the metal oxide composite 200 may be prepared as follows.

First, referring to FIG. 5A, a first metal oxide composite sheet 110 and a second metal oxide sheet 120 are alternately stacked to prepare the stacked structure 100. The number of the first metal oxide composite sheet 110 stacked and the number of at least one second metal oxide sheet 120 stacked may be 1 to 2000, respectively, but the number of the stacked sheets are not limited thereto.

Then, referring to FIG. 5B, the composition 130 in the form of a slurry including the third metal oxide is coated on a side surface, e.g., a first side surface 101 and the opposite second side surface 102 of the stacked structure 100.

The composition 130 in the form of a slurry including the third metal oxide may include the third metal oxide, a dispersing agent, a solvent, a binder, a plasticizing agent, and a sintering aid, but embodiments are not limited thereto, and any suitable component needed in preparation of a slurry containing a metal oxide in the art may be additionally included in the composition 130. Further, in the composition 130 in the form of a slurry, at least one of a dispersing agent, a solvent, a binder, a plasticizing agent, and a sintering aid may be omitted. Types of the dispersing agent, solvent, binder, plasticizing agent, and sintering aid used in the preparation of the composition 130 in the form of a slurry are not particularly limited, and any material available in the art to form the third metal oxide layer 130 may be used.

Subsequently, referring to FIG. 5C, the substrate 150 and the third metal oxide powder layer 140 on the substrate 150 are disposed at a constant thickness. While not wanting to be bound by theory, it is understood that the powder layer 140 prevents impurities that are generated by a reaction between the stacked structure 100 and the substrate 150 during a sintering process. The powder layer 140 includes a metal oxide that is the same as a metal oxide in a surface of the stacked structure 100 in contact with the powder layer 140. For example, when the lowermost layer of the sintered result 100 is the first metal oxide composite layer 110, the powder layer 140 is the first metal oxide powder. For example, when the lowermost layer of the sintered result 100 is the second metal oxide layer 120, the powder layer 140 is the second metal oxide powder.

Next, referring to FIG. 5D, the stacked structure 100 is disposed on the third metal oxide powder layer 140, and this is sintered in the air atmosphere at a temperature in a range of about 900° C. to about 1100° C. for 1 minute to about 20 hours.

Figure 5E:
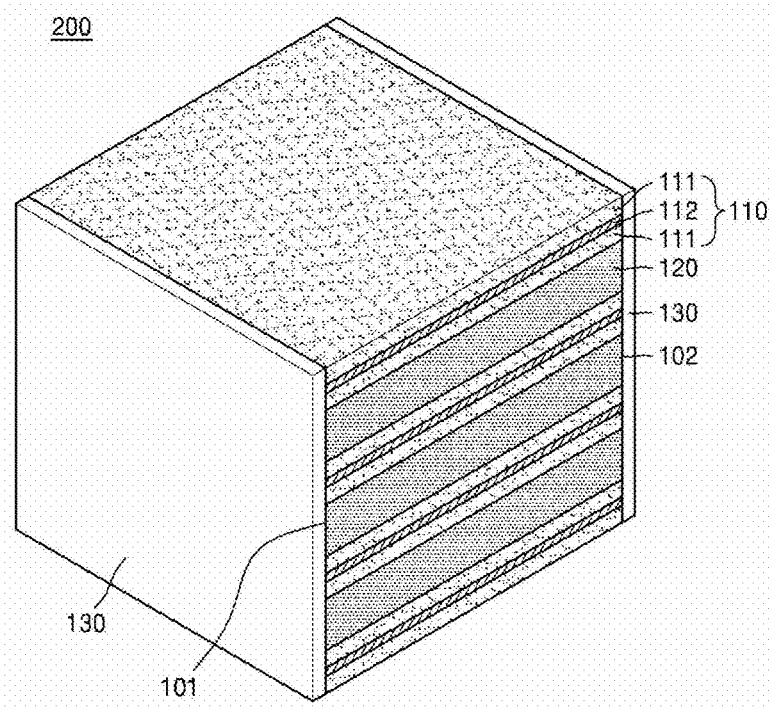

Then, referring to FIG. 5E, the metal oxide composite 200 including the stacked structure 100, in which the first metal oxide composite layer 110 having the electrode layer 111 between the current collector layers 112 and the second metal oxide layer 120 are alternately stacked; and the third metal oxide layer 130 that is disposed on both side surfaces 101 and 102 of the stacked structure 100 may be obtained by the sintering process.

Alternatively, the metal oxide composite 200 may be prepared as follows.

First, as shown in FIG. 5A, at least one first metal oxide composite sheet 110 and at least one second metal oxide sheet 120 are alternately stacked to prepare the stacked structure 100.

Further, as shown in FIG. 5C, the substrate 150 and the third metal oxide powder layer 140 on the substrate 150 are disposed at a constant thickness.

Then, referring to FIG. 6A, the stacked structure 100 is disposed on the third metal oxide powder layer 140 disposed on the substrate 150.

Subsequently, referring to FIG. 6B, the stacked structure 100 is completely embedded with a third metal oxide powder 131, and this is sintered in the air atmosphere at a temperature in a range of about 900° C. to about 1100° C. for 1 minute to about 20 hours.

The third metal oxide powder layer 140 and the third metal oxide powder 131 may be the first metal oxide powder or the second metal oxide powder. For example, when the uppermost layer and the lowermost layer of the stacked structure 100 is the first metal oxide composite layer 110, the powder layer 140 disposed on the substrate 150 includes the first metal oxide powder and the powder 131 covering the stacked structure 100 also includes the first metal oxide powder. For example, when the uppermost layer and the lowermost layer of the stacked structure 100 is the second metal oxide layer 120, the powder layer 140 disposed on the substrate 150 includes the second metal oxide powder and the powder 131 covering the stacked structure 100 also includes the second metal oxide powder.

Figure 6C:
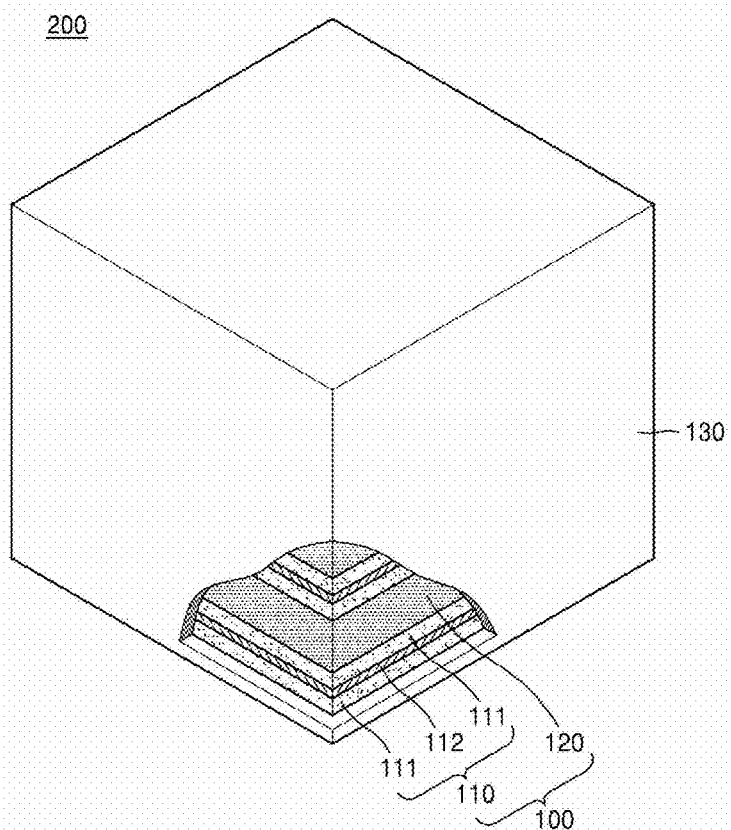

Next, referring to FIG. 6C, the metal oxide composite 200 of which all surfaces of the stacked structure 100 are surrounded by the third metal oxide layer 130 may be prepared by the sintering process. An internal structure of the metal oxide composite 200 is as shown in FIG. 4.

In the metal oxide composite 200, the second metal oxide layer 120 is removed by performing etching on the metal oxide composite 200, and sequentially adding a current collector layer, a lithium ion conductive solid electrolyte layer, and an anode layer on the etched metal oxide composite 200 to prepare a lithium battery having a 3-dimentional structure. For the metal oxide composite 200 as shown in FIG. 4, cutting of the metal oxide composite 200 is required before etching the second metal oxide layer 120.

Hereinafter, embodiments of are described in detail with reference to Examples and Comparative Examples. However, Examples are presented herein for illustrative purpose only, and do not limit the scope of the invention concept.

EXAMPLES (Preparation of Metal Oxide Composite)

Comparative Example 1

Referring to FIGS. 7A to 7D, an electrode sheet 111 including $LiCoO_2$, a second metal oxide sheet 120 including $Li_2CoSiO_4$, and a current collector slurry including an Ag—Pd alloy were prepared.

The electrode sheet 111 including $LiCoO_2$ was prepared as follows.

A slurry including a $LiCoO_2$ powder having an average particle diameter (D50) of about 1 μm; polyvinyl butyral, as a binder; dibutyl phthalate, as a plasticizing agent; an ester-based surfactant, as a dispersing agent; and a mixture solvent including toluene and ethanol at a pre-determined ratio, as a solvent was coated on a substrate by using Doctor Blade and dried to prepare the electrode sheet 111 including $LiCoO_2$. In the electrode sheet 111, an amount of the $LiCoO_2$ powder was about 80 wt %. A thickness of the electrode sheet 111 was about 18 μm.

The second metal oxide sheet 120 including $Li_2CoSiO_4$ was prepared as follows.

The second metal oxide sheet 120 was prepared in the same manner as in preparation of the electrode sheet 111 including $LiCoO_2$, except that a $Li_2CoSiO_4$ powder having an average particle diameter (D50) of about 1 μm was used instead of the $LiCoO_2$ powder. In the second metal oxide sheet 112, an amount of the $Li_2CoSiO_4$ powder was about 80 wt %. A thickness of the second metal oxide sheet 112 was about 28 μm.

The current collector slurry including an Ag—Pd alloy was prepared in the same manner as in preparation of a slurry for the electrode sheet 111, except that an Ag—Pd alloy powder was used instead of the $LiCoO_2$ powder.

Figure 7A:
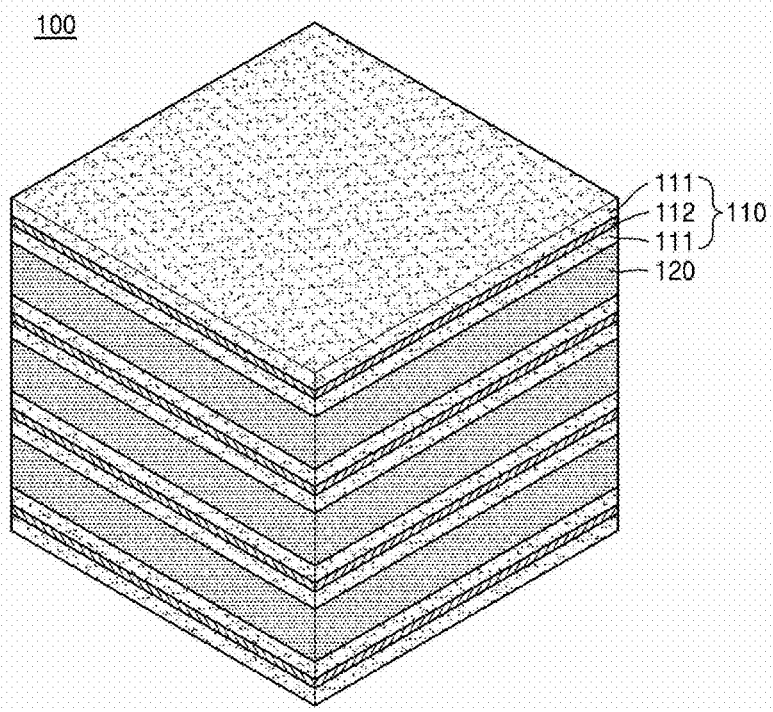
FIGS. 7A to 7D are schematic views illustrating a method of preparing a metal oxide composite prepared in Comparative Example 1.

Referring to FIG. 7A, the electrode sheet 111 including $LiCoO_2$ was disposed, the current collector slurry including an Ag—Pd alloy was disposed on the electrode sheet 111 by using a screen printing method so that the electrode sheet 111 was coated with current collector slurry at a thickness of about 5 μm to form a current collector layer 112, the electrode sheet 111 including $LiCoO_2$ was disposed on the current collector layer 112, and the second metal oxide sheet 120 including $Li_2CoSiO_4$ was disposed on the electrode sheet 111 including $LiCoO_2$. By repeating this stacking process, the stacked structure 100 was prepared. The electrode sheet 111 was disposed on the lowermost layer and the uppermost layer of the stacked structure 100.

Figure 7B:
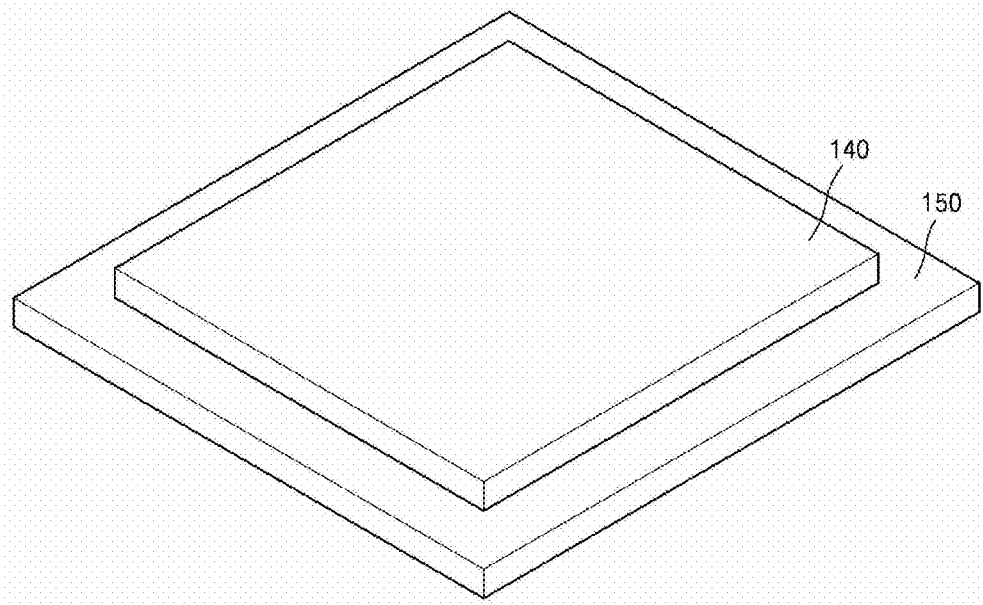

Referring to FIG. 7B, an alumina ($Al_2O_3$) substrate 150 having a $LiCoO_2$ powder layer 140 on a surface thereof at a constant thickness was prepared.

Figure 7C:
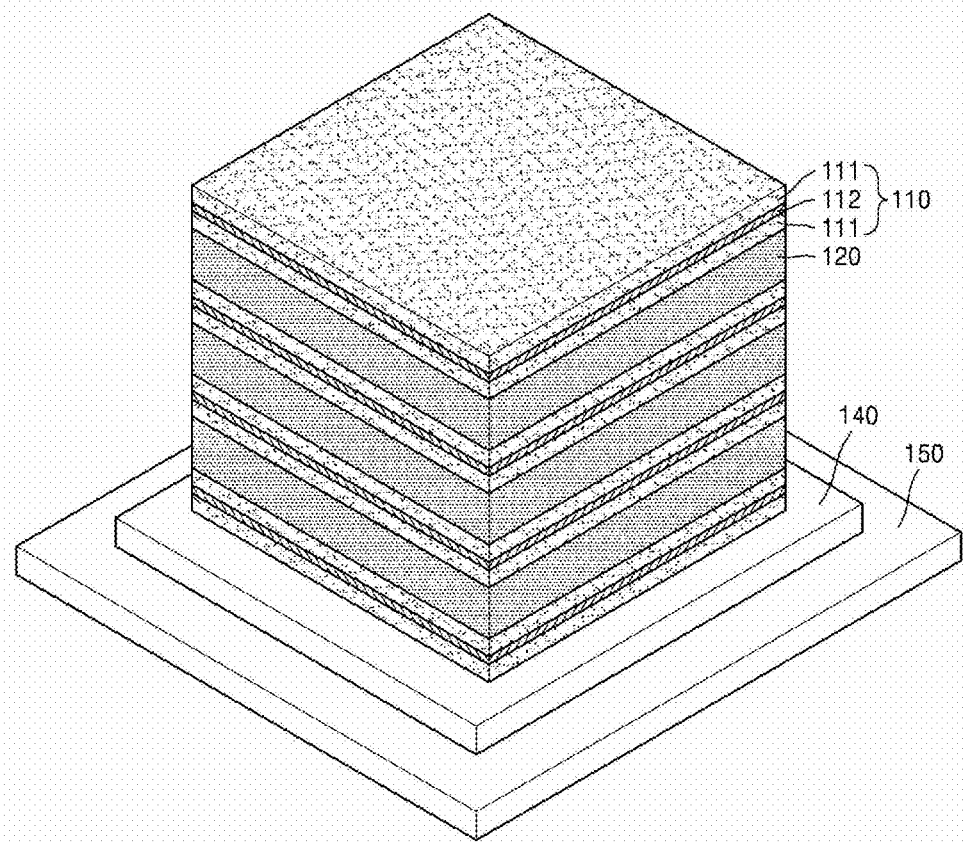
Figure 7D:
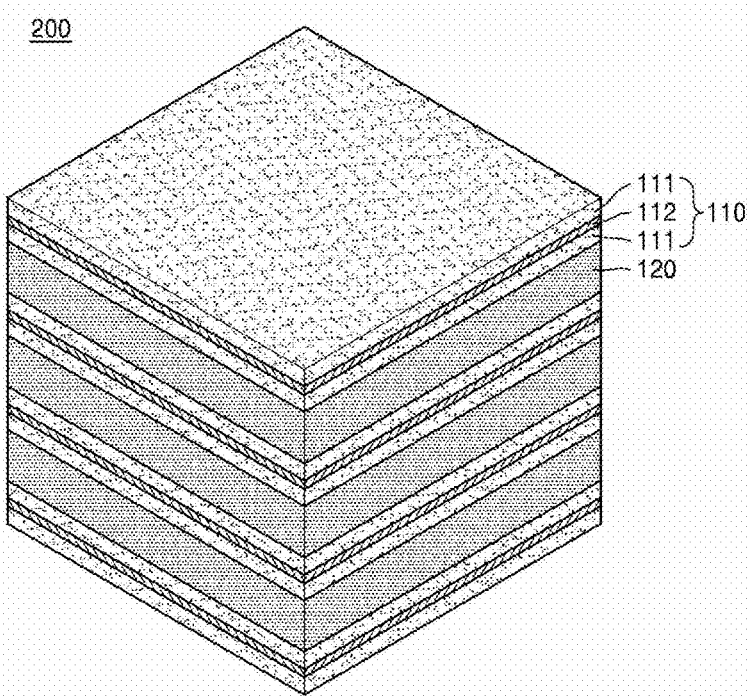
Figure 8A:
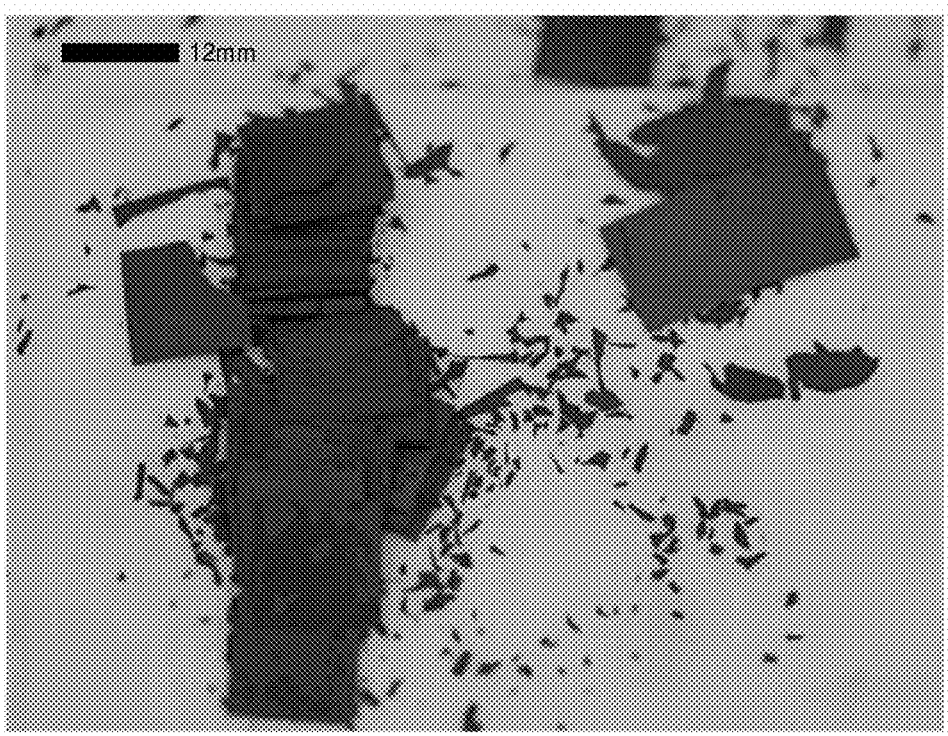
FIGS. 8A to 8D are images showing cracking and peeling that occur in the metal oxide composite prepared in Comparative Example 1.
Figure 8B:
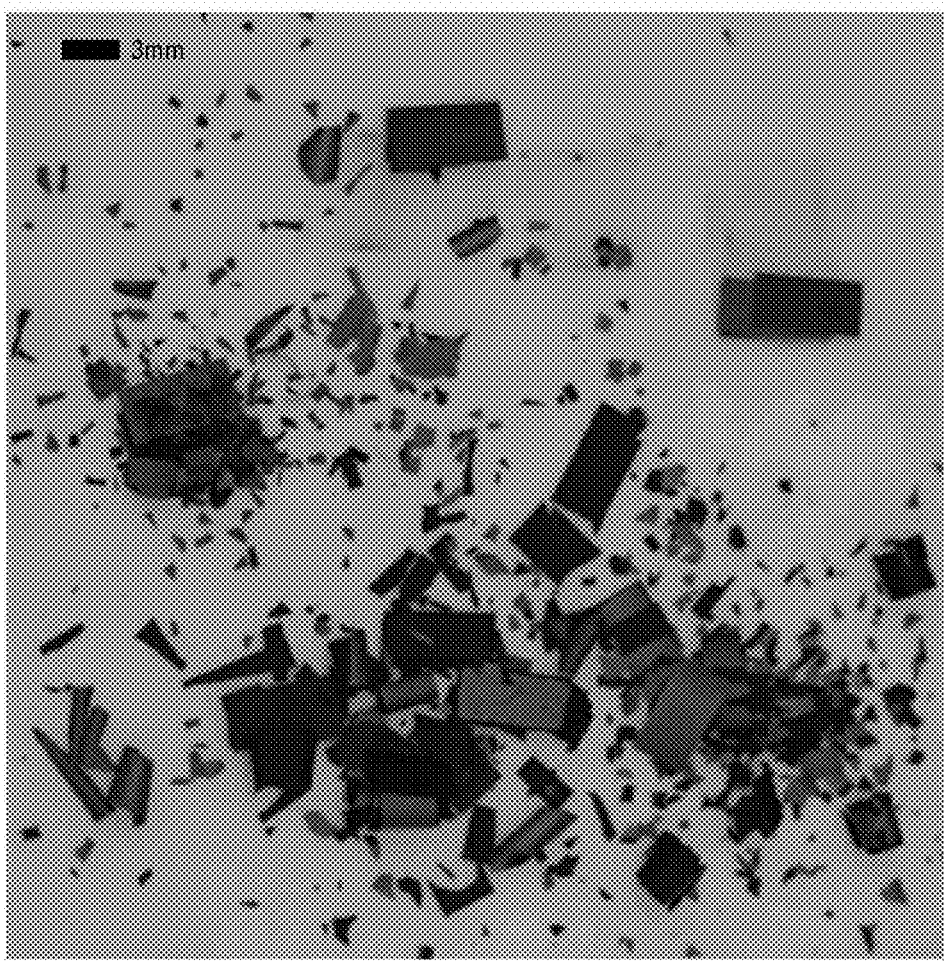
Figure 8C:
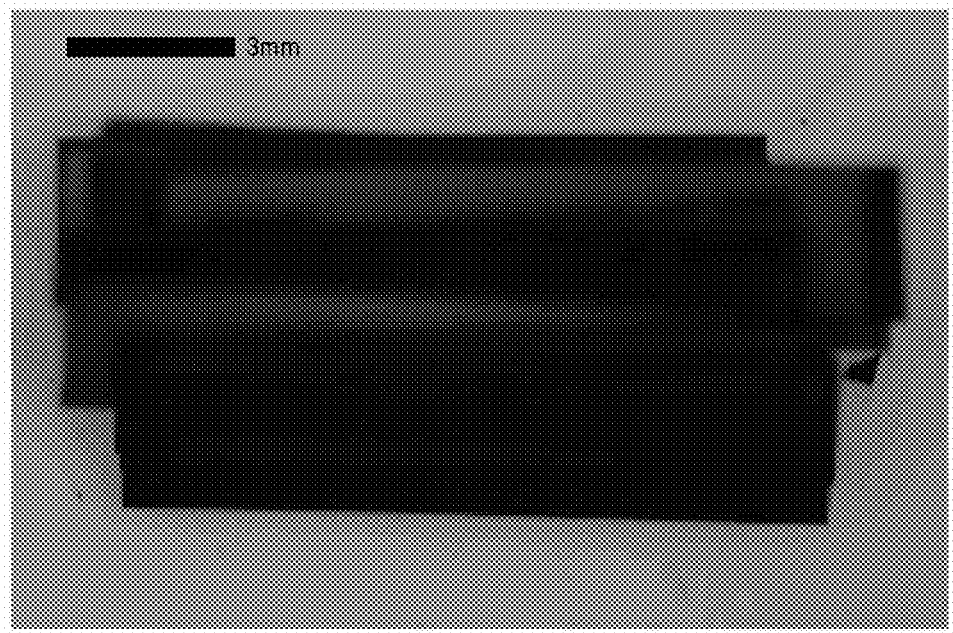
Figure 8D:
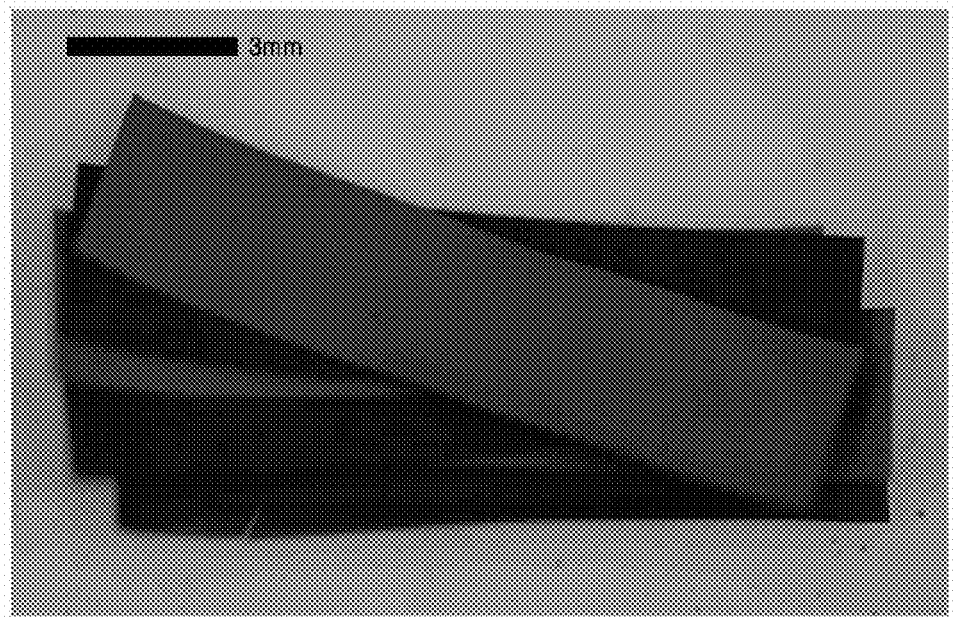

Referring to FIGS. 7C and 7D, after disposing the stacked structure 100 on the $LiCoO_2$ powder layer 140, this was sintered in the air atmosphere at a temperature of about 1050° C. for about 10 minutes to about 8 hours to prepare the metal oxide composite 200.

Example 1: Slurry Coating

An electrode sheet 111 including $LiCoO_2$, a second metal oxide sheet 120 including $Li_2CoSiO_4$, and a current collector slurry including an Ag—Pd alloy were prepared in the same manner as in Comparative Example 1

Further, a slurry composition 130 including a $LiCoO_2$ powder having an average particle diameter (D50) of about 1 μm; polyvinyl butyral, as a binder; dibutyl phthalate, as a plasticizing agent; an ester-based surfactant, as a dispersing agent; and a mixture solvent including toluene and ethanol at a common ratio, as a solvent was prepared.

Referring to FIG. 5A, the electrode sheet 111 including $LiCoO_2$ was disposed, the current collector slurry including an Ag—Pd alloy was disposed on the electrode sheet 111 by using a screen printing method so that the electrode sheet 111 was coated with the current collector slurry at a thickness of about 5 μm to form a current collector layer 112, the electrode sheet 111 including $LiCoO_2$ was disposed on the current collector layer 112, and the second metal oxide sheet 120 including $Li_2CoSiO_4$ was disposed on the electrode sheet 111 including $LiCoO_2$. By repeating this stacking process, the stacked structure 100 was prepared. The electrode sheet 111 was disposed on the lowermost layer and the uppermost layer of the stacked structure 100.

Then, referring to FIG. 5B, the slurry composition 130 including a $LiCoO_2$ powder was coated on one side surface 101 and the other side surface 102 opposing the one side surface 101 of the stacked structure at a thickness of about 20 μm by using a screen printing method.

Referring to FIG. 5C, an alumina ($Al_2O_3$) substrate 150 having a $LiCoO_2$ powder layer 140 on a surface thereof at a constant thickness was prepared.

Referring to FIGS. 5D and 5E, after disposing the stacked structure 100 coated with the slurry composition 130 on the $LiCoO_2$ powder layer 140 on the substrate 150, this was sintered in the air atmosphere at a temperature of about 1050° C. for about 10 minutes to prepare the metal oxide composite 200.

Example 2: Providing Powder

An electrode sheet 111 including $LiCoO_2$, a second metal oxide sheet 120 including $Li_2CoSiO_4$, and a slurry including an Ag—Pd alloy were prepared in the same manner as in Comparative Example 1.

Referring to FIG. 5A, the electrode sheet 111 including $LiCoO_2$ was disposed, the current collector slurry including an Ag—Pd alloy was disposed on the electrode sheet 111 by using a screen printing method so that the electrode sheet 111 was coated with the current collector slurry at a thickness of about 5 μm to form a current collector layer 112, the electrode sheet 111 including $LiCoO_2$ was disposed on the current collector layer 112, and the second metal oxide sheet 120 including $Li_2CoSiO_4$ was disposed on the electrode sheet 111 including $LiCoO_2$. By repeating this stacking process, the stacked structure 100 was prepared. The electrode sheet 111 was disposed on the lowermost layer and the uppermost layer of the stacked structure 100.

Referring to FIG. 5C, an alumina ($Al_2O_3$) substrate 150 having a $LiCoO_2$ powder layer 140 on a surface thereof at a constant thickness was prepared.

Then, referring to FIG. 6B, the stacked structure 100 was disposed on the $LiCoO_2$ powder layer 140 on the substrate 150 and then the stacked structure 100 was completely covered by the $LiCoO_2$ powder 131.

Referring to FIGS. 6B and 6C, after completely covering the stacked structure 100 was disposed on the $LiCoO_2$ powder layer 140 with the $LiCoO_2$ powder 131, this was sintered in the air atmosphere at a temperature of about 1050° C. for about 4 hours to prepare the metal oxide composite 200.

Example 3: Providing Powder

A metal oxide composite was prepared in the same manner as in Example 2, except that a period of time for the sintering was changed to 6 hours.

Example 4: Providing Powder

A metal oxide composite was prepared in the same manner as in Example 2, except that a period of time for the sintering was changed to 8 hours.

Evaluation Example 1: Evaluation of Compactness in Metal Oxide Composite

Occurrence of cracking and peeling of the metal oxide composites prepared in Comparative Example 1 and Examples 1 to 4 were evaluated.

As shown in FIGS. 8A to 8D, the metal oxide composite prepared in Comparative Example 1 had cracks generated during the sintering process, and peeling occurred in the metal oxide composite prepared in Comparative Example 1 after the sintering process.

Figure 9A:
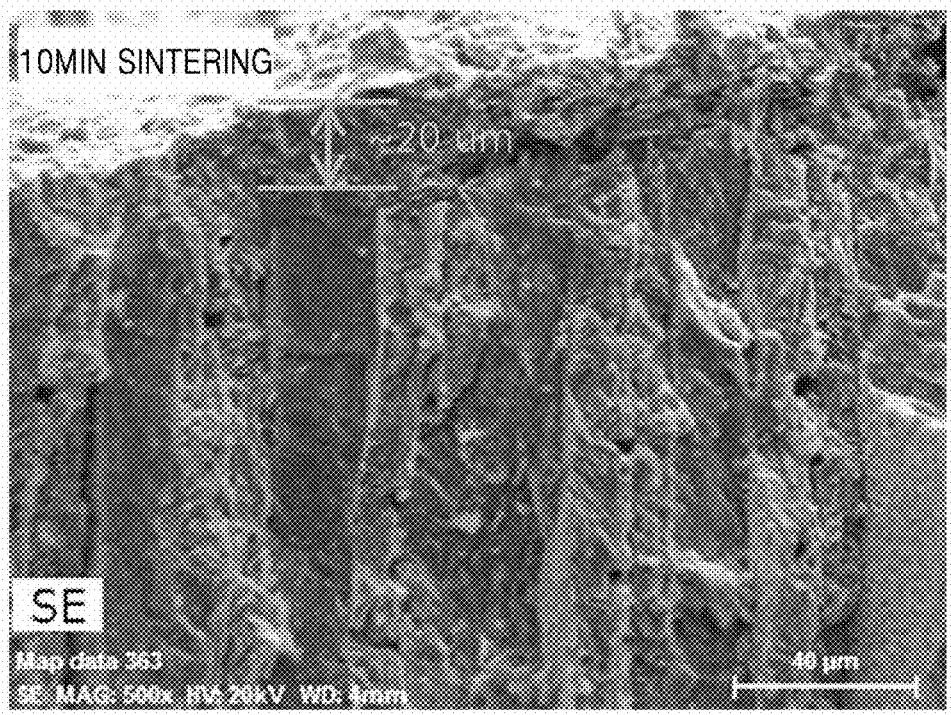
FIG. 9A is a scanning electron microscope (SEM) image of a cross-sectional view of the metal oxide composite prepared in Example 1.
Figure 9B:
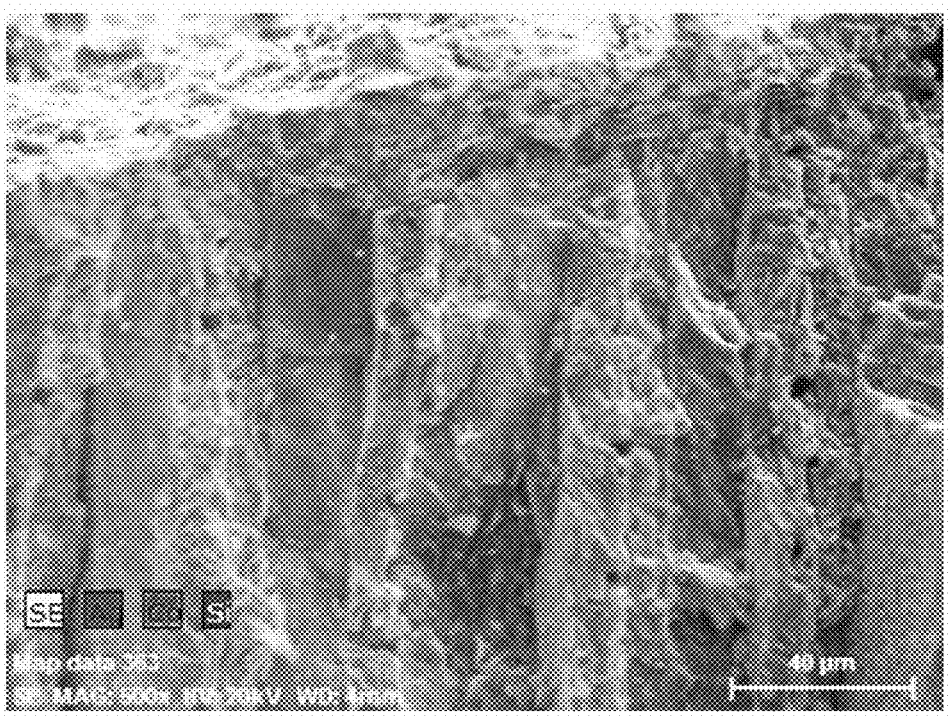
FIGS. 9B to 9E are electron dispersive X-ray (EDX) images of a cross-sectional view of the metal oxide composite prepared in Example 1.
Figure 9C:
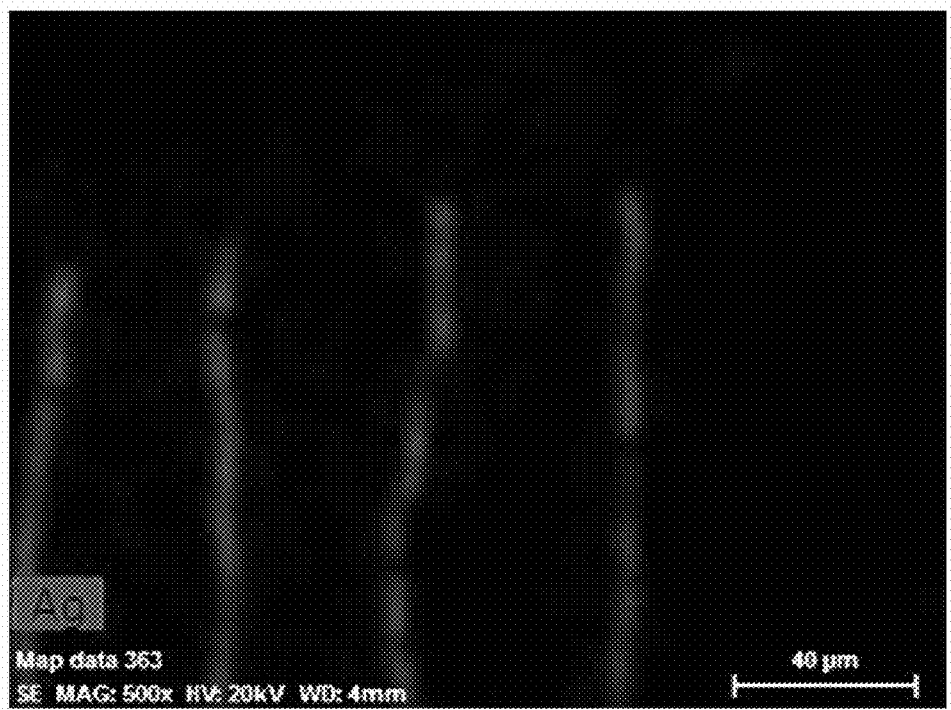
Figure 9D:
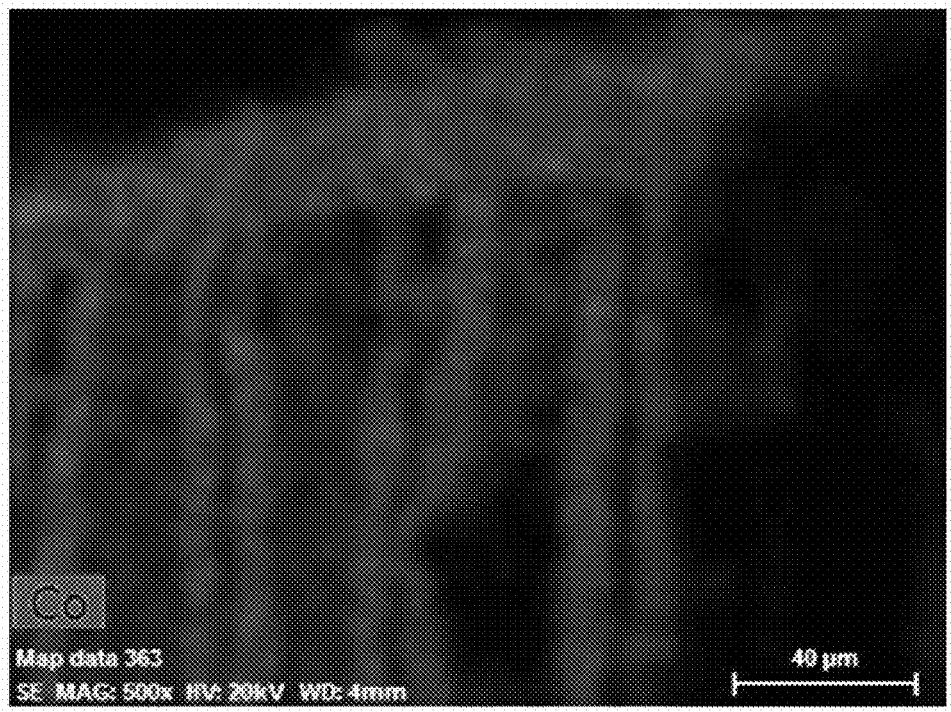
Figure 9E:
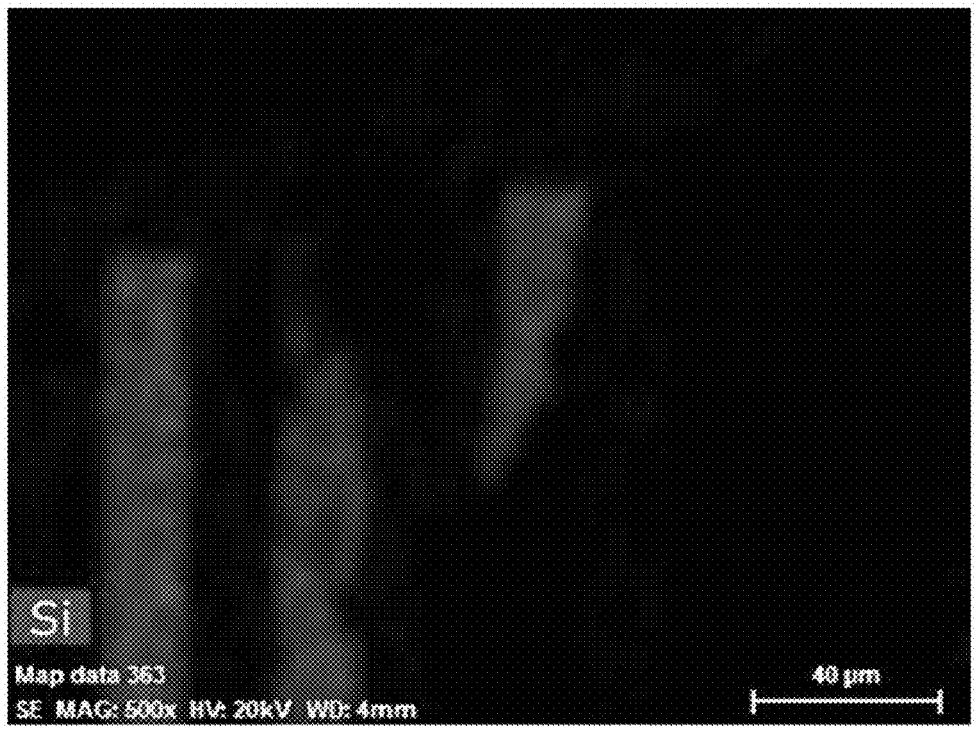

On the other hand, as shown in FIG. 9A, no crack was generated in the metal oxide composite prepared in Example 1 during the sintering process, and the compact metal oxide composite without peeling after the sintering process was obtained.

Further, as shown in FIGS. 9B to 9E, from the result of an EDX analysis, it may be known that the metal oxide composite prepared in Example 1 had a current collector layer (Ag), a electrode layer (Co), and a sacrificial layer (Si) that are alternately stacked and tightly attached to one another.

Figure 10A:
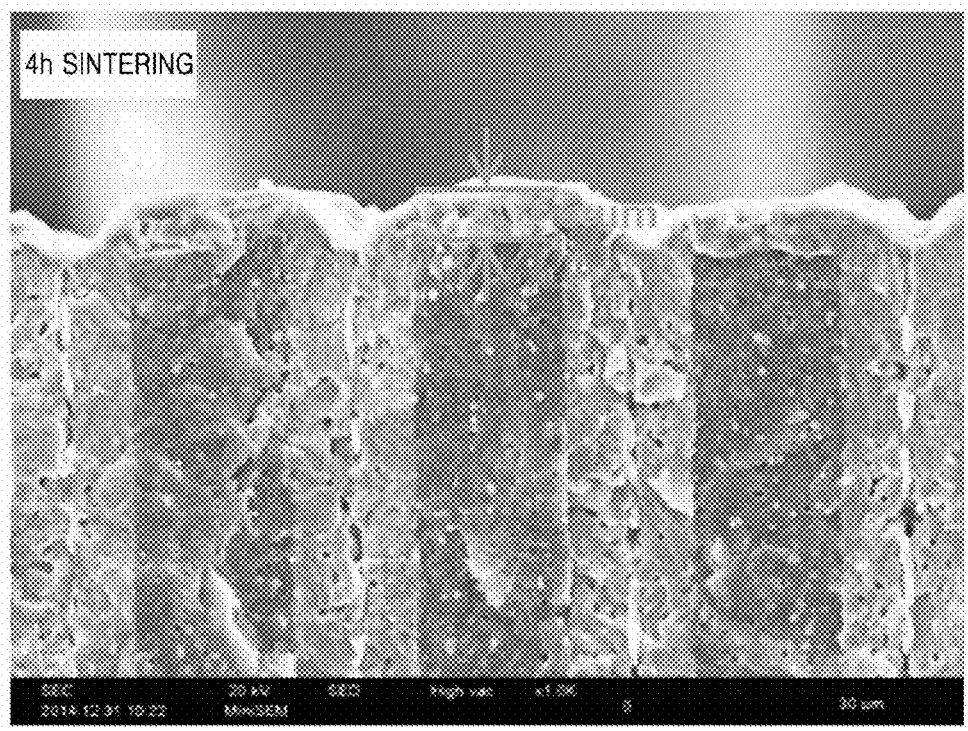
FIG. 10A is a SEM image of a cross-sectional view of the metal oxide composite prepared in Example 2.
Figure 10B:
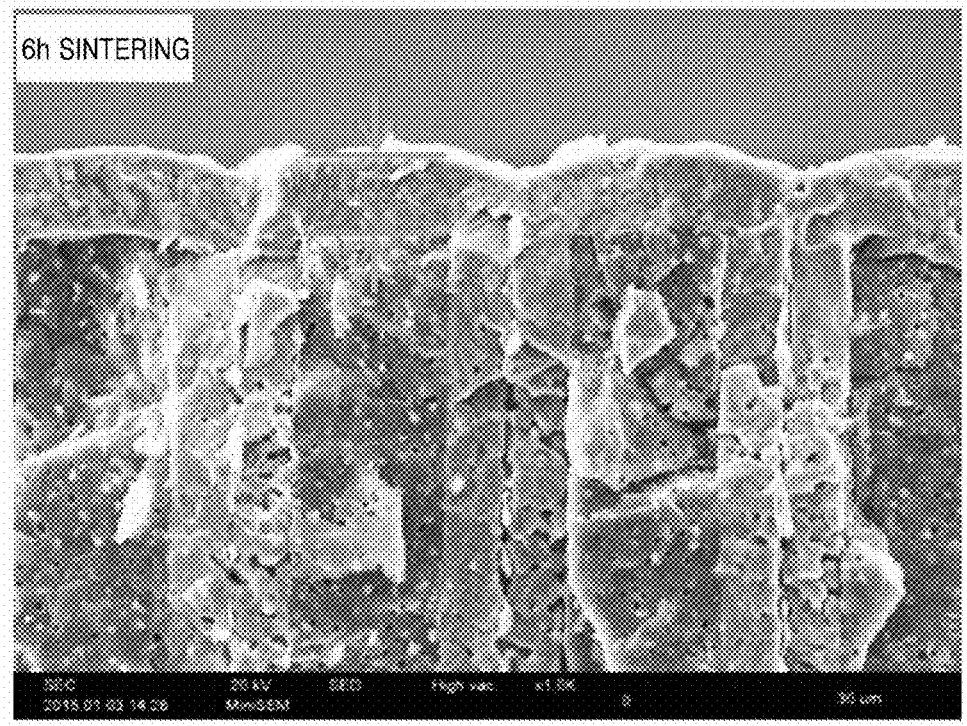
FIG. 10B is a SEM image of a cross-sectional view of the metal oxide composite prepared in Example 3.
Figure 10C:
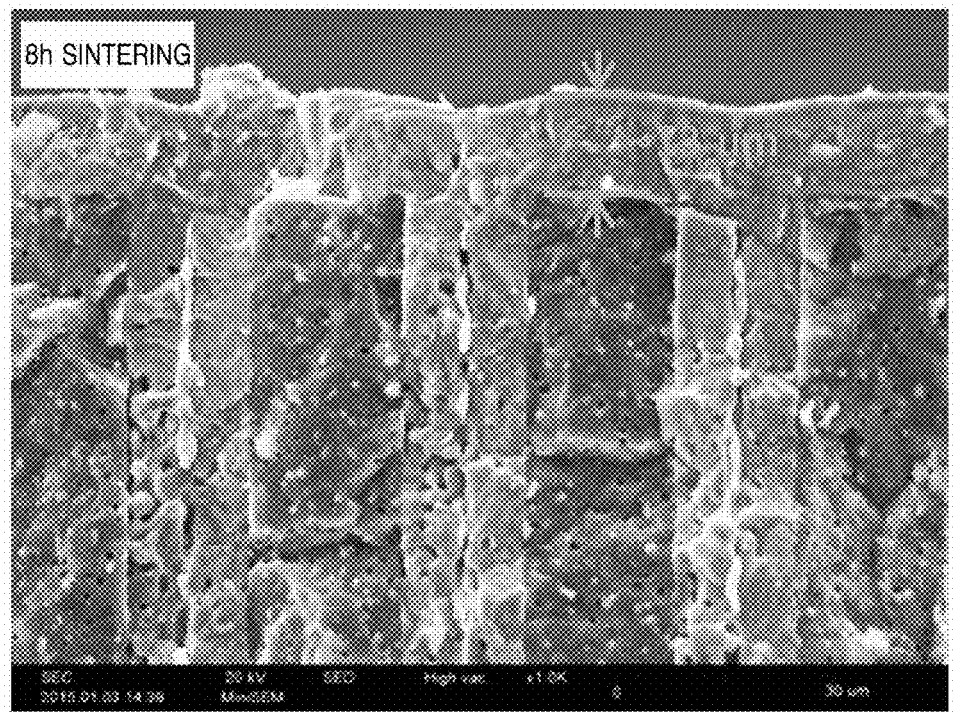
FIG. 10C is a SEM image of a cross-sectional view of the metal oxide composite prepared in Example 4.

Further, as shown in FIGS. 10A to 10C, no crack was generated in the metal oxide composites prepared in Examples 2 to 4 as well, and the compact metal oxide composite without peeling after the sintering process was obtained. Further, as a period of time for the sintering increased, a thickness of the $LiCoO_2$ layer being coated increased, and thus the thickness and attaching strength of the $LiCoO_2$ layer being coated may be controlled according to the period of time for the sintering.

According to an aspect of an exemplary embodiment, when a metal oxide is disposed on at least two side surfaces of a metal oxide stacked structure, wherein the metal oxide is the same with a metal oxide included in the metal oxide stacked structure, cracking and peeling of the metal oxide stacked structure after a sintering process may be prevented.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal oxide composite comprising:
   a stacked structure comprising
      a first metal oxide composite layer, and
      a second metal oxide layer, wherein the first metal oxide composite layer and the second metal oxide layer are alternately stacked in a thickness direction; and
   a third metal oxide layer that is disposed on a side surface of the first metal oxide composite layer and a side surface of the second metal oxide composite layer and covers at least a part of the side surface of the first metal oxide composite layer and the side surface of the second metal oxide composite layer,
   wherein the third metal oxide layer comprises a metal oxide that is a same metal oxide as a metal oxide contained in the stacked structure,
   wherein the third metal oxide layer is disposed on a first end surface of the stacked structure and on a second end surface of the stacked structure, and
   wherein the third metal oxide layer is disposed on a first side surface of the first metal oxide composite layer and a first side surface of the second metal oxide composite layer and on an opposite second side surface of the first metal oxide composite layer and an opposite second side surface of the second metal oxide composite layer.

2. The metal oxide composite of claim 1, wherein the third metal oxide layer completely surrounds the stacked structure.

3. The metal oxide composite of claim 1, wherein the third metal oxide layer comprises the first metal oxide or a second metal oxide, which is a same second metal oxide as a second metal oxide of the second metal oxide layer.

4. The metal oxide composite of claim 1, wherein a thickness of the first metal oxide composite layer is about 100 micrometers or less.

5. The metal oxide composite of claim 1, wherein the second metal oxide layer is a sacrificial layer.

6. The metal oxide composite of claim 1, wherein a thickness of the second metal oxide layer is about 200 micrometers or less.

7. A method of preparing the metal oxide composite of claim 1, the method comprising
   alternately stacking the first metal oxide composite layer and the second metal oxide layer to prepare the stacked structure;
   disposing a composition that comprises the third metal oxide on the side surface of the first metal oxide composite layer and the side surface of the second metal oxide composite layer,
   wherein the third metal oxide layer is disposed on a first end surface of the stacked structure and on a second end surface of the stacked structure, and
   wherein the third metal oxide layer is disposed on a first side surface of the first metal oxide composite layer and a first side surface of the second metal oxide composite layer and on an opposite second side surface of the first metal oxide composite layer and an opposite second side surface of the second metal oxide composite layer; and then
   sintering the stacked structure to prepare the metal oxide composite,
   wherein the composition comprising the third metal oxide comprises the metal oxide that is the same metal oxide as the metal oxide contained in the stacked structure.

8. The method of claim 7, wherein the composition comprising the third metal oxide is in a form of a slurry, a sheet, or a powder.

9. The method of claim 8, wherein the composition is in the form of a slurry, and
wherein the disposing of the composition comprises at least one method selected from screen printing, spin coating, brushing, and disposing a composition sheet and performing warm isostatic press of the composition sheet.

10. The method of claim 8, wherein the composition is in the form of a powder, and
wherein the disposing of the composition comprises embedding the stacked structure within the composition.

11. The method of claim 8, wherein the sintering of the stacked structure comprises disposing the composition on a third metal oxide layer, which is in a form of a powder.

12. The method of claim 8, wherein, the sintering of the stacked structure comprises sintering at a temperature in a range of about 800° C. to about 1100° C. for about 1 minute to about 20 hours.

13. The metal oxide composite of claim 1, wherein the side surface of the first metal oxide composite layer is parallel to the thickness direction of the stacked structure.

14. A metal oxide composite comprising:
a stacked structure comprising
a first metal oxide composite layer, and
a second metal oxide layer, wherein the first metal oxide composite layer and the second metal oxide layer are alternately stacked in a thickness direction; and
a third metal oxide layer that is disposed on a side surface of the stacked structure,
wherein the third metal oxide layer comprises a metal oxide that is a same metal oxide as a metal oxide contained in the stacked structure, and
wherein a thickness of the third metal oxide layer is about 50 micrometers or less,
wherein the third metal oxide layer is disposed on a first end surface of the stacked structure and on a second end surface of the stacked structure, and
wherein the third metal oxide layer is disposed on a first side surface of the first metal oxide composite layer and a first side surface of the second metal oxide composite layer and on an opposite second side surface of the first metal oxide composite layer and an opposite second side surface of the second metal oxide composite layer.

15. A metal oxide composite comprising:
a stacked structure comprising
a first metal oxide composite layer, and
a second metal oxide layer, wherein the first metal oxide composite layer and the second metal oxide layer are alternately stacked in a thickness direction; and
a third metal oxide layer that is disposed on a side surface of the stacked structure,
wherein the third metal oxide layer covers at least a part of the side surface of the first metal oxide composite layer and the side surface of the second metal oxide composite layer,
wherein the third metal oxide layer comprises a metal oxide that is a same metal oxide as a metal oxide contained in the stacked structure, and
wherein the first metal oxide composite layer comprises a current collector layer, and
an electrode layer that is disposed on a surface of the current collector layer.

16. The metal oxide composite of claim 15, wherein the electrode layer comprises a first electrode layer and a second electrode layer, and
wherein the current collector layer is disposed between the first electrode layer and the second electrode layer.

17. The metal oxide composite of claim 15, wherein the electrode layer comprises a first metal oxide, and wherein the first metal oxide is selected from a lithium transition metal oxide, a lithium transition metal phosphate, and a transition metal oxide.

18. The metal oxide composite of claim 15, wherein the current collector layer comprises at least one selected from Al, Ag, Cu, Ni, Co, Cr, W, Mo, Pd, Pt, an Ag—Pd alloy, an Ag—Pt alloy, an Ag—Pd—Pt alloy, and a Pd—Pt alloy.

* * * * *